United States Patent [19]
Parker et al.

[11] Patent Number: 5,268,734
[45] Date of Patent: * Dec. 7, 1993

[54] REMOTE TRACKING SYSTEM FOR MOVING PICTURE CAMERAS AND METHOD

[75] Inventors: Jeffrey L. Parker, Ponte Vedra Beach; David F. Sorrells, Jacksonville; John D. Mix, Jacksonville; Richard P. Daber, Jacksonville, all of Fla.

[73] Assignee: ParkerVision, Inc., Jacksonville, Fla.

[*] Notice: The portion of the term of this patent subsequent to Jan. 12, 2010 has been disclaimed.

[21] Appl. No.: 530,999

[22] Filed: May 31, 1990

[51] Int. Cl.$^5$ .................. G01B 11/26; G01J 1/20; G03B 19/18; G05B 1/06
[52] U.S. Cl. .................. 356/152; 250/203.3; 250/206.1; 352/53; 358/125; 318/640
[58] Field of Search .................. 356/APS 1, 141, 152, 356/4; 358/107, 113, 125; 250/206.1, 206.2, 203.5, 203.3; 352/APS 53, 197, 243; 342/37, 51; 318/640

[56] References Cited

U.S. PATENT DOCUMENTS

| | | | |
|---|---|---|---|
| 3,671,963 | 6/1972 | Assouline et al. | |
| 3,775,767 | 11/1973 | Fielding | 342/37 |
| 3,846,026 | 11/1974 | Waters | 356/152 |
| 3,900,846 | 8/1975 | Gibbon et al. | 342/37 |
| 4,020,339 | 4/1977 | Gustafson | 356/152 |
| 4,067,015 | 1/1978 | Mogavero et al. | 358/125 X |
| 4,268,167 | 5/1981 | Alderman | 356/1 |
| 4,609,939 | 9/1986 | Kozawa et al. | 358/210 X |
| 4,682,173 | 7/1987 | Kotah et al. | 342/51 |
| 4,700,301 | 10/1987 | Dyke | 364/424 |
| 4,820,041 | 4/1989 | Davidson et al. | 356/1 |
| 4,874,238 | 10/1989 | Ochi et al. | 356/1 |
| 4,895,440 | 1/1990 | Cain et al. | 356/5 |
| 4,912,643 | 3/1990 | Beirxe | 364/449 |
| 4,980,871 | 12/1990 | Sieber et al. | 318/648 |
| 5,073,824 | 12/1991 | Vertin | 358/210 |

FOREIGN PATENT DOCUMENTS

0191133 8/1988 Japan .................. 358/125

Primary Examiner—Stephen C. Buczinski
Attorney, Agent, or Firm—Arthur G. Yeager

[57] ABSTRACT

The system includes a mobile remote unit sensitive to infrared (IR) signals transmitted by a base or stationary unit and an IR transmitter which is placed behind a rotating lens whose position at any time is known with precision resulting in the IR signal being "scanned" across an area. The remote unit detects when the peak strength of the signal occurs and provides this data via an RF signal to the base unit wherein the exact effective angle between the axis of the IR signal and the remote unit creates an error signal used by the base unit to position the camera mounted thereon. Transmitters for TILT and two PAN positions, PAN 1 and PAN 2, are used to include range calculations for ZOOM functions. Command circuitry to override the automatic tracking function is provided in each of the units.

70 Claims, 14 Drawing Sheets

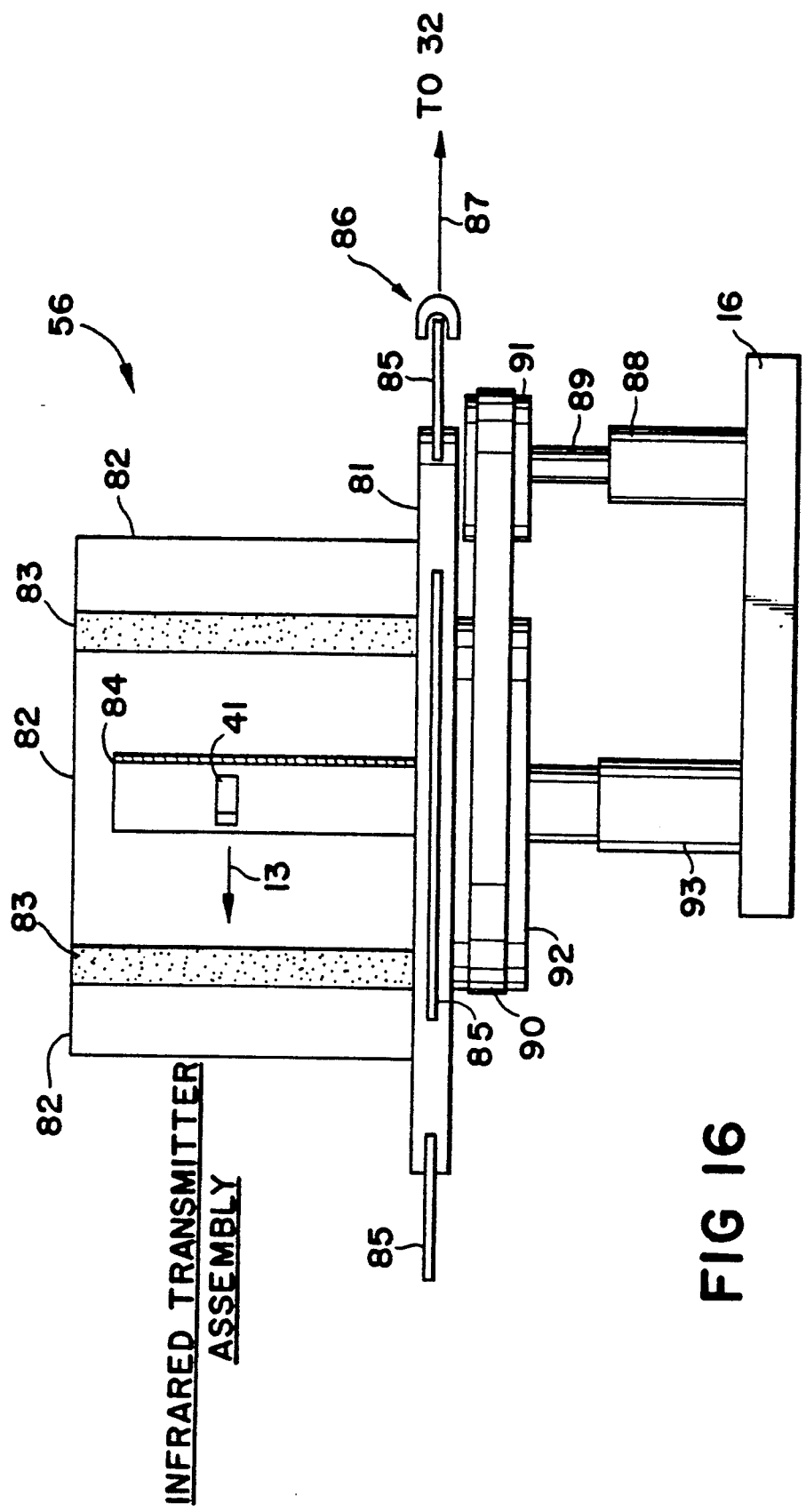

REMOTE TRACKING SYSTEM FOR MOVING PICTURE CAMERAS AND METHOD

BACKGROUND OF THE INVENTION

1. Field of the Invention

The present invention relates to tracking systems that allow cameras to automatically follow moving targets and particularly to systems that allow remote control of such tracking cameras.

2. Prior Art

Apparatus that involves automatic tracking of cameras include systems employing special coating on moving objects and multiple cameras such as that disclosed in U.S. Pat. No. 4,064,528 for following a hockey puck. See also U.S. Pat. No. 4,853,771 for objects that include proprietary encoding schemes for use in robot vision. Signal source tracking systems include U.S. Pat. No. 4,067,015 which discloses a system of multiple detectors fixed in location with computer-controller signal processing to direct a spotlight at a movable signal transmitter.

The limitations of the prior art become clear when a user desires a video camera to track his or her movements throughout an area. Multiple detectors are expensive and systems employing such schemes require time consuming set up and initial alignment procedures. Multiple cameras can be prohibitively expensive as can be the case with special filters and image-splitting systems in the device of U.S. Pat. No. 4,064,528 referenced above.

What is needed in a camera tracking system is a simple device that a user can put on the belt or in a pocket and have a camera follow the user around by focusing on the remote device or devices being worn. The system should be able to pan 360° in the horizontal and tilt widely in the vertical position. The system should specifically avoid the use of expensive optical coatings, multiple cameras, special optical filters, and expensive signal processing circuitry. The devices known in the prior art are deficient in one or more of the above aspects.

SUMMARY OF THE INVENTION

In one aspect of the invention there is provided a system for calculating the angular displacement of two objects with respect to a reference position comprising a base unit and a remote unit. The base unit has a first transmitter means producing a first transmitted signal which includes signal positioning means for varying the angular displacement of the position of the signal in either the horizontal or vertical plane during a time interval with respect to a reference angle as established by the signal positioning means and includes position detecting means for providing a position output signal representative of the position of the signal during a first time interval. The remote unit includes first receiver means responsive to the signal and providing a receiver output signal in response to the receiver output signal. The remote unit further includes second transmitter means for transmitting a second transmitted signal and being responsive to the first output signal for providing in the second transmitted signal an information signal indicative of the receiver output signal having been detected. The base unit further includes second receiver means responsive to the second transmitted signal for providing a second output signal indicative of the first output signal and further includes control circuit means responsive to the position output signal and the second output signal for determining the angular displacement of the position of the first transmitted signal and for determining the angular displacement between the reference angle and the first receiver means and providing an error output signal indicative of the angular displacement.

Other aspects are seen wherein the signal positioning means varies the angular displacement of the position of the signal by varying the angular displacement of the position of a predetermined level of the signal strength. The position output signal provided by the position detecting means is representative thereof The receiver circuit means includes signal strength detection circuit means for determining the relative strength of the receiver output signal and providing a first output signal when the receiver output signal is at the predetermined level. The second transmitter means provides information signal indicative of the strength of the receiver output signal being at the predetermined level. The signal positioning means includes a movable lens positioned between the first transmitter means and the receiver, and mechanical means for repetitive movement of the lens and position detecting means. The first transmitter means includes an infrared signal source. The second transmitted signal is a radio frequency signal.

Further aspects are set forth in which the control circuit means includes means for comparing one error output signal indicative of one angular displacement with a successive error output signal indicative of a successive angular displacement for determining the directional movement of the remote unit with respect to the base unit and second means for determining the real time of successive angular displacements of the remote unit for determining the rate of directional movement. The base unit includes movable means responsive to an error output signal for moving the base unit in response to the error output signal. The base unit further includes command circuit means for selectively providing a plurality of command signals to the control circuit means for selectively altering the error output signal provided from the control circuit means to the movable means for selectively controlling the movement of the base unit in response to the error signals and allowing the control circuit means to provide the error output signal to the movable means. Another command signal when selected will alter the error output signal by an angular deviation from the angular displacement determined by the error output signal thus defining an offset angle. In another aspect of the present invention there is provided an apparatus for determining the location of one first object with reference to a second object comprising a base unit in a known position with respect to the second object and a remote unit in a known position with respect to the first object. Both of the remote unit and the first object are movable in one, two and three dimensions, and such apparatus includes a pair of systems as described above. One system is used in the horizontal plane and the other is used for the vertical plane. The signal receiver means includes either a single signal receiver circuit means common to both of the systems or a signal receiver circuit means for each of the systems.

In such apparatus the control circuit means includes computational circuit means for determining the directional movement of a remote unit in a plane with respect to the base unit by successive comparison of a first error control signal indicative of the angular displacement in a plane of the remote unit during one respective time interval with another first error control signal during another time interval and providing a second error control signal indicative of directional movement. The computational circuit means includes clock means for determining the real time of successive comparisons for computing the rate of directional movement of the remote unit. The computational circuit means also includes circuit means for distance determination of the remote unit from the base unit and providing a third error control signal indicative of the distance determination.

The second object includes a camera having a visual lens and the base unit further includes movable means responsive to the error control signals from each system for moving the camera in response to respective error control signals and operating an adjustable zoom lens via zoom control means in response to a zoom control signal for selective adjustment of the lens in response to the distance determination. The apparatus also includes signal transmitter control circuit means for providing alternating transmitter control signals to each respective signal transmitter means for causing one respective signal transmitter means to transmit a scanning signal from one respective system before the transmission of a scanning signal from the other system.

Additional aspects of the present invention include a method of calculating the angular displacement of one object with respect to a reference angle comprising the steps of: A. scanning an area containing the object with a transmitted signal from a radiant energy source by varying the position of the signal through the area with respect to an angle during a time interval; B. detecting at the object the transmitted signal received at the object; C. providing a data signal indicative of the time at which the transmitted signal was received at the object; D. determining the point in the time interval at which each angular position of the transmitted signal during the time interval; and E. computing the angular displacement of the object with respect to the reference angle by comparing the point in the time interval at which the object received the transmitted signal with the angular position of the transmitted signal with respect to the same point in the time interval. Step A may include the steps of: placing a movable lens between the radiant energy source and the object; transmitting the signal through the lens; and moving the lens with respect to the radiant energy source to vary the position of a predetermined level of the signal strength through the area during the time interval. Step A may also include the steps of: scanning the area substantially in the horizontal and vertical planes. The method also includes the step of: providing an output signal indicative of the calculated angular displacement. Step D may include the step of: detecting the position of the lens during the time interval.

A further additional aspect is seen by the provision of a method of tracking a movable object with a camera, mounted on a movable means, having an adjustable field of view lens by repetitively determining the location of the object with respect to a reference position, such method comprising the steps of: A. repetitively scanning an area containing the object with a first and second transmitted signal from a respective first and second radiant energy source by varying the position of the signal through the area in substantially the horizontal plane with the first signal and in substantially the vertical plane with the second signal and each through a series of time intervals; B. repetitively detecting at the object the transmitted signals which are received at the object; C. providing a first and second data signal indicative of the time at which the first and second transmitted signals were received at the object; D. determining the point in each time interval at which the angular position of each signal occurs with respect to a reference position during each time interval; E. repetitively computing the angular displacement of the object with respect to the reference position in the horizontal and vertical planes by repetitively comparing the results of steps C and D; F. computing the direction of movement of the object in the horizontal and vertical planes by successively comparing the calculated angular displacements of the object in each plane; and G. moving the camera in accordance with the results obtained in step F. Step E. may include the steps of: providing a first output signal indicative of the angular displacement of the object from the reference position in the horizontal plane to the movable means; providing a second output signal indicative of the angular displacement of the object from the reference position in the vertical plane to the movable means; and moving the camera by the movable means in response to the output signals to alter the angular displacement of the object from the reference position in either one or both of the horizontal and vertical planes.

BRIEF DESCRIPTION OF THE DRAWINGS

The novel feature which are believed to he characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 16 is a simplified side view of the assembly of FIG. 4 with a lens removed to illustrate the relative positions of the components thereof.

DETAILED DESCRIPTION OF THE PREFERRED EMBODIMENT INTRODUCTION

The present invention is an electro-mechanical system including a movable base unit device on which a camera is mounted and designed to automatically position on a subject and follow that subject as the device moves from side-to-side (PAN) including vertical movements (TILT). A base unit houses the system computer and related circuitry which determines the camera position and movement speed in response to position data and operator commands sent by a remote unit that is carried or worn by the subject. The device base unit is mounted on a tripod or table top. The tracking system is specifically designed for use with moving picture cameras, such as those employing video tape.

The base unit of the tracking system transmits infrared signals to the remote unit and uses RF signal feedback to determine the location and distance of the subject. This is accomplished by placing an IR transmitter behind a set of lenses designed to narrow the IR beam. The lenses are rotated around the fixed IR transmitter and scan an area in front of the base unit. The base unit includes a microprocessor which monitors a position switch and clock timer to calculate the exact effective angle between the transmitter and lens array. The remote unit transmits a radio frequency signal to the base unit when the received IR signal is at its "peak", that is, when the transmitter and remote unit receiver are aligned. The angle at which the peak occurred is the direction from the base unit to the remote unit. The base unit includes three IR transmitter and lens array assemblies for use respectively, in PAN 1, PAN 2, and TILT. The use of two assemblies will allow for distance calculation in accord with the usual trigonometric principles for use as needed in controlling the camera. This information from PAN and TILT allows the computer to control the direction and speed of the PAN and TILT motors. The base unit will adjust the camera to keep the subject in the field of view (FRAME) of the camera.

CIRCUITRY DESCRIPTION

Figure 1:
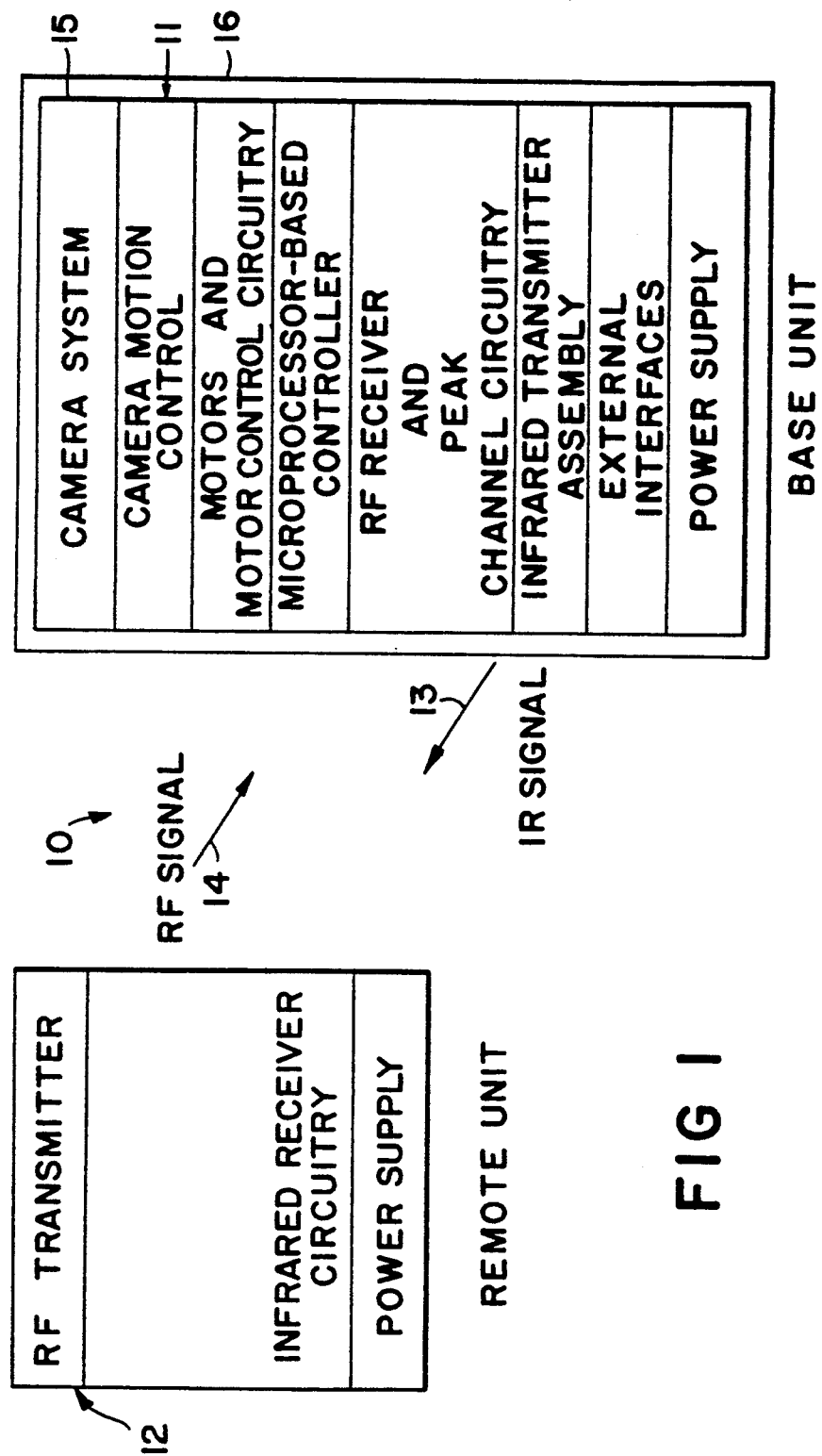
FIG. 1 is a simplified block diagram of the base unit and remote unit of the video camera tracking system in accord with the present invention.

With reference now to FIG. 1, the remote tracking system 10 in accord with the present invention is illustrated in simplified block diagram form. The base unit 11 is in communication with the remote unit 12 via one or more IR signals 13 and the RF signal 14. The camera 15 is mounted with base unit 11 in a housing 16 on a tripod or table (not shown). Base unit 11 includes an RF receiver and a microprocessor-based controller which directs control signals to the positioning motors via their controls.

The unit 11 also includes an appropriate power supply including a battery, which may be rechargeable as understood in the art.

The remote unit 12 includes an IR receiver section which has the appropriate signal processing circuitry. The RF transmitter in the remote unit 12 will modulate a digital signal in response to the "IR signal peak" detection circuitry located in the IR receiver section. The simpliest embodiment of the tracking system needs only a single PAN transmitter and a TILT transmitter. The preferred embodiment of the system 10 employs two PAN assemblies, PAN 1 and PAN 2, for distance measurement. The three IR transmitter and lens array assemblies are physically spaced and mounted for transmission through housing 16 in a manner so as not to interfere with operation of the camera 15. As will also be explained herebelow, the RF signal 14 can be transmitted over cables or be provided by other signaling techniques or hardwired communication buses.

Figure 2:
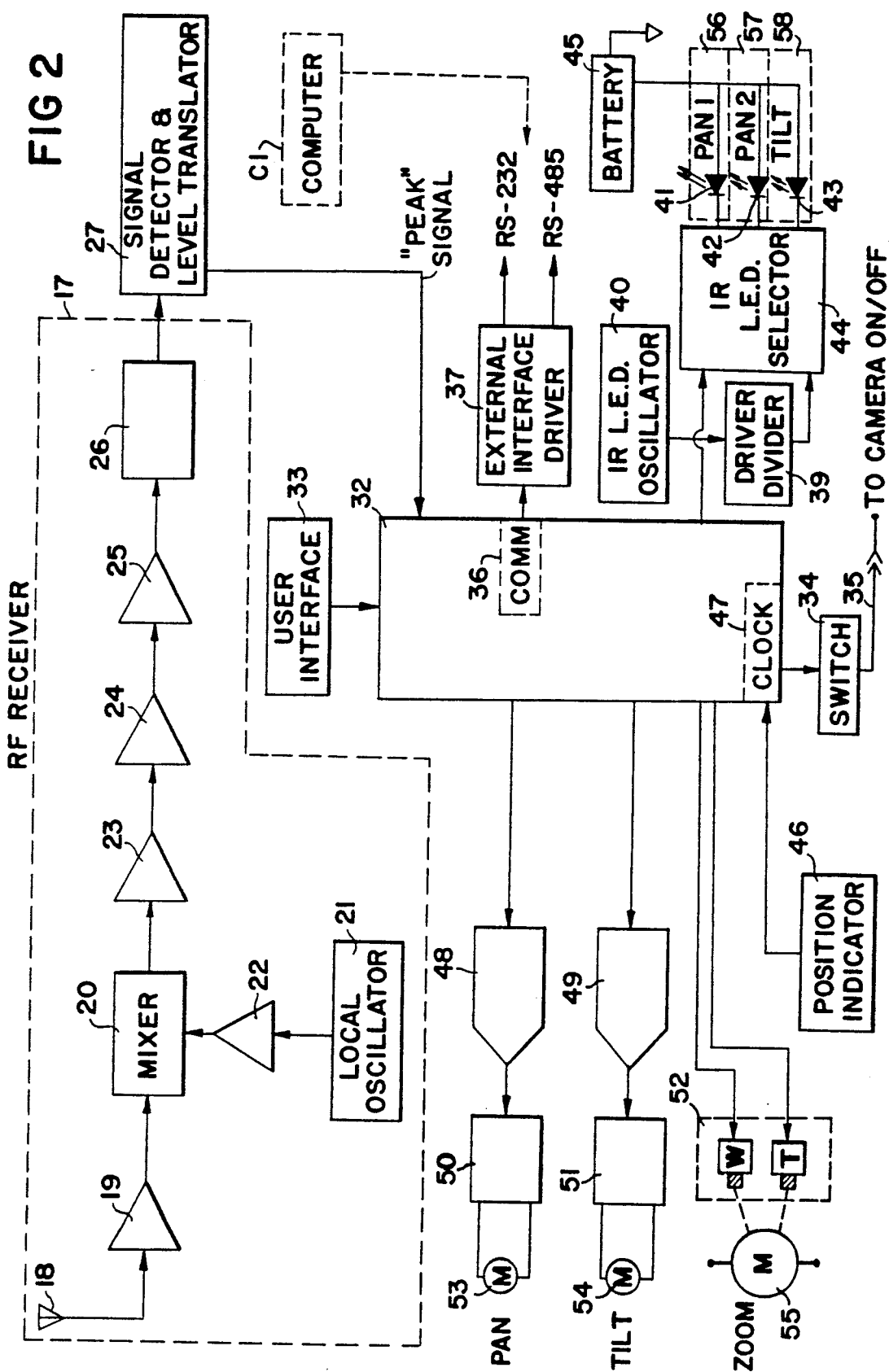
FIG. 2 is a detailed block diagram of the base unit of FIG. 1.

With reference now to FIG. 2, a more detailed block diagram of the base unit 11 is illustrated. The base unit includes a conventional RF receiver circuit unit 17 receiving a signal via antenna 18 and including RF amplifier 19, mixer 20, local oscillator 21, driver 22, and IF amps 23-25 signal rectifier 26. Signal detector and level translator 27 provide an output signal representing the "peak" signal that has been transmitted from remote unit 12 and is used as a microprocessor INTERRUPT.

The command circuitry of base unit 11 is built around controller 32 and communicates with user interface circuitry 33 which includes components such as switches, displays, and lights, and electronic switch 34 connected to camera ON/OFF switch plug 35. COMM circuit 36 includes a UART for external interface circuit 37 which includes drivers for all the standard baud rates and allows connection to standard RS-232 and RS485 communication bus interfaces.

The IR transmitters for PAN 1 PAN 2, and TILT are infrared LEDs 41, 42, 43, respectively. The particular IR LED to be enabled is selected by controller 32 via IR transmitter selector circuit 44. Power for the entire unit 11 is supplied by a battery 45 which may be rechargeable or a line voltage transformer may be used.

Controller 32 monitors the position of the IR signals 13 via a position indicator 46 and clock circuit 47 as will be further explained. The controller 32 also supplies signals to digital-toanalog circuits 48 and 49 to drive PAN and TILT motor control circuits 50, 51 respectively, which are connected to their respective PAN and TILT motors 53 and 54. The motor control circuits 50, 51 use "chopper drive" technology with "back-emf" feedback for closed loop speed control. The D/A converters 48, 49 allow controller 32 to supply the proper voltage for the desired speed of motors 53, 54 to controllers 50, 51. The direction of the motors 53, 54 is also controlled by controller 32. ZOOM motor 55 also is controlled by the controller 32 via motor control solenoids 52.

As can be understood from the above description, the "peak" signal, which indicates alignment of a base unit 11 transmitter and the remote unit 12, is referenced via position indicator 46 and clock 47. The computer 32 will control the transmitters 41-43 and motors 53-55 as appropriate. Each IR transmitter 41-43 is mounted in an IR transmitter assembly 56-58, respectively, which includes focusing lenses as will be discussed in more detail below.

Figure 3:
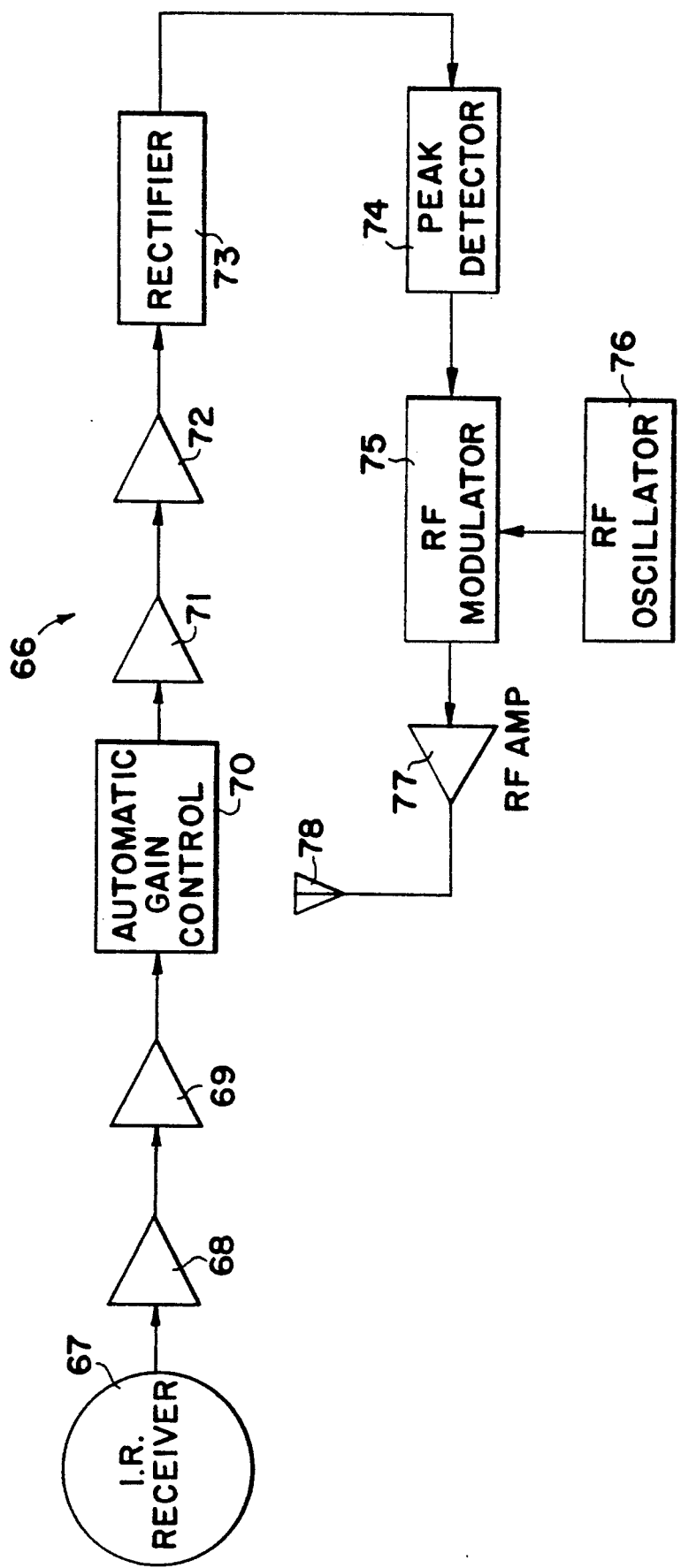
FIG. 3 is a detailed block diagram of the remote unit of FIG. 1.
Figure 4:
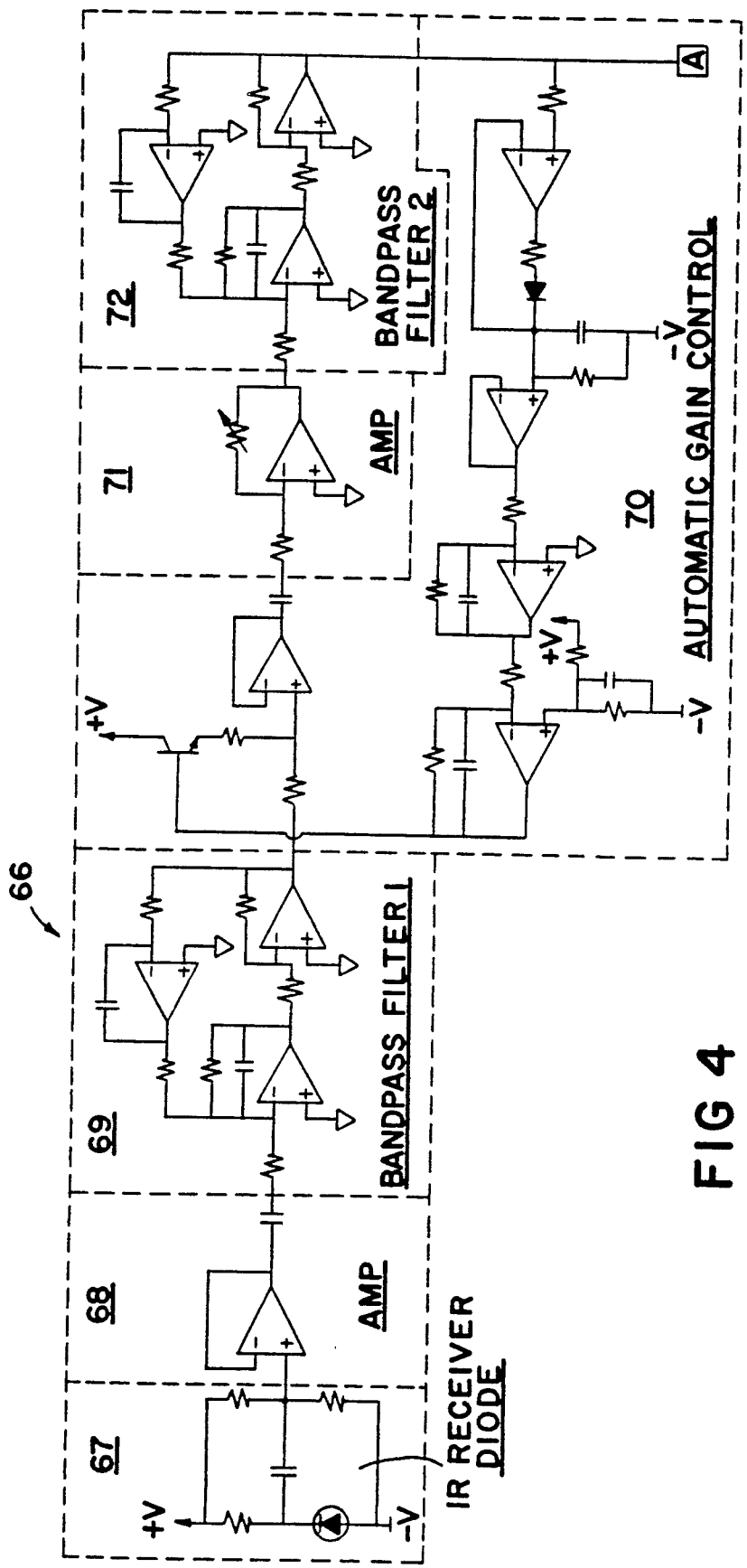
FIG. 4 is a partial schematic diagram of the remote unit of FIG. 1.

With reference now to FIG. 3, the remote unit 12 is illustrated in block diagram form. Infrared receiver circuitry 66 includes an IR receiver 67 to provide an output to amplifier 68 and then to bandpass filter 69. Automatic gain control circuit 70 outputs to another amplifier 71 and bandpass filter 72. The signal is converted to DC via rectifier 73 and supplied to "peak" detector 74 which in turn supplies a signal to conventional RF circuits 75, 76, 77 and antenna 78. The transmitted RF signal 14 will include information regarding the "peak" or maximum value of the scanned IR signal(s) 13 and is transmitted for use with the positioning indicating and timing circuits of the base unit 11 for use in the automatic tracking mode of the system 10.

With reference now to FIGS. 4-12 a more detailed schematic of the circuitry employed in the present invention is presented.

The IR receiver circuitry 66 includes an IR receiver diode circuit 67 which supplies an output to two bandpass filters 69 and 72 which work with automatic gain control circuit 70 to improve the signal-to-noise ratio thus allowing for use of the system 10 over greater distances. After the signal is converted to DC via rectifier 73, peak detector 74 provides a pulse level for the control of RF modulator 75 in the usual manner. The remote unit 12 will thus provide an RF signal containing information indicating that a signal "peak" was received at the unit 12 by diode 67. The unit 12 is powered by conventional batteries (not shown) or an appropriate DC power supply (not shown).

Base unit 11 includes an antenna 18 which provides a signal through conventional RF circuitry 19, 20, 21 and 22 which employs IC1, a hybrid IC crystal oscillator. IF amplifiers/filters 23, 24, 25 provide an output to signal detector/level translator circuitry 27 via rectifier 26. The "peak" signal output is supplied to a microprocessor, U1, in controller 32 where it is used as an INTERRUPT signal.

Figure 7:
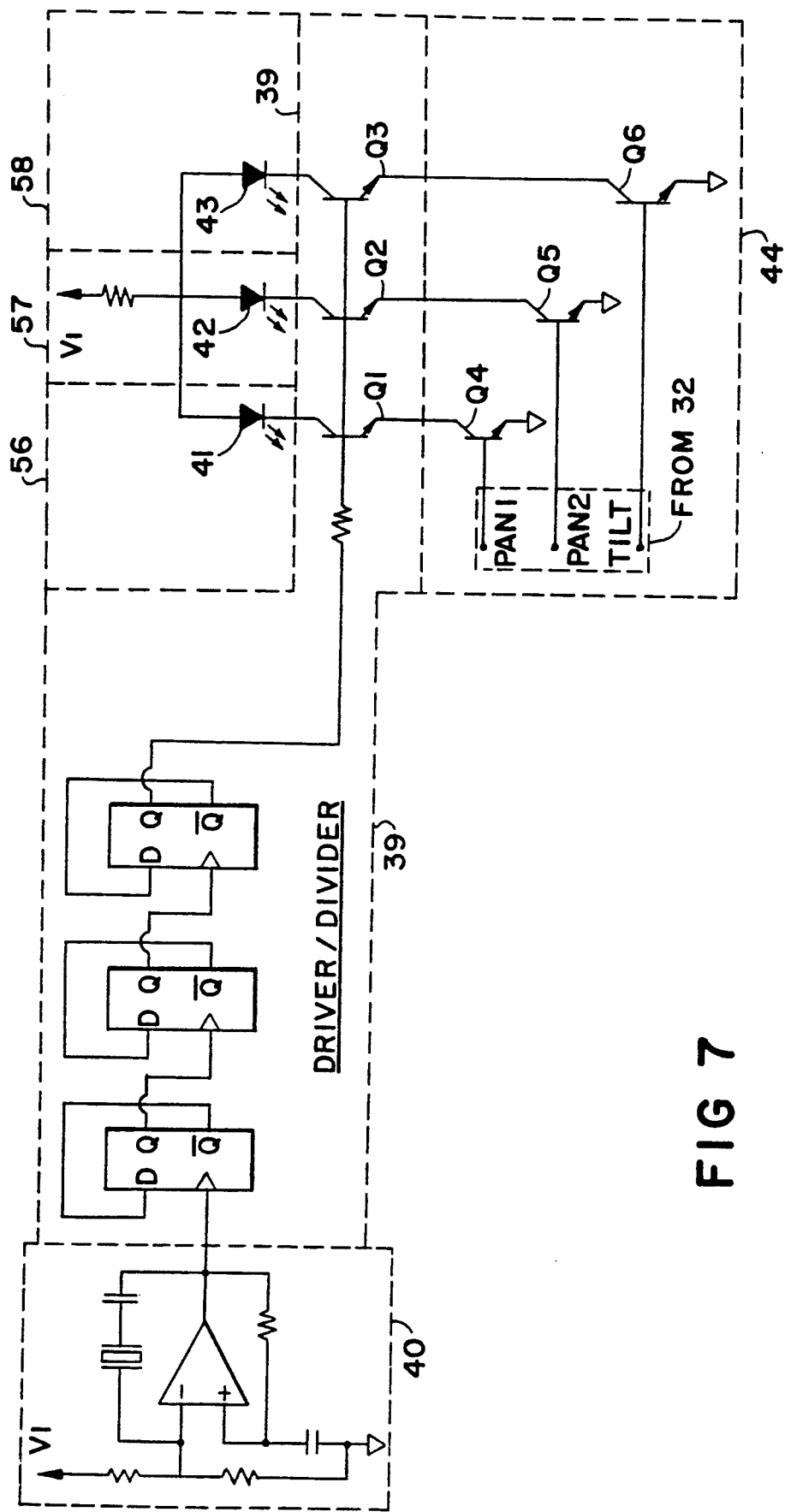
FIG. 7 is a schematic diagram of the infrared LED circuitry of the base unit.

FIG. 7 illustrates the IR LED oscillator 40 which supplies an output to a "divide-down" flip-flop circuitry 39 to drive transistors Q1-Q3. IR LED selector 44 receives an input from controller 32 and Q4-Q6 to power IR LEDs 41-43 respectively.

Figure 10:
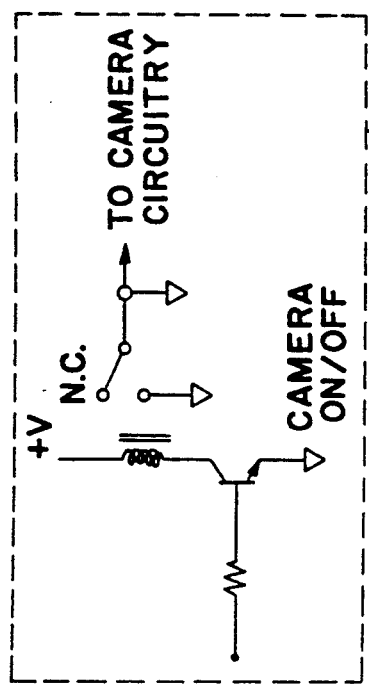
FIG. 10 is a schematic diagram of the camera switch circuitry.
Figure 9:
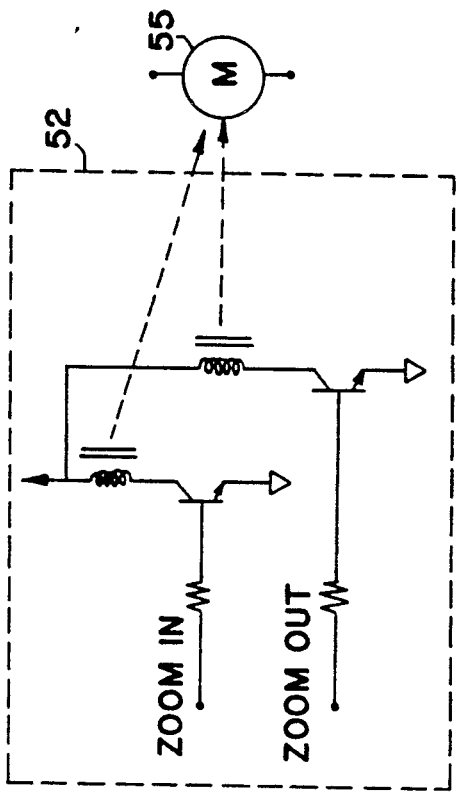
FIG. 9 is a schematic diagram of the Zoom motor circuitry of the base unit.
Figure 8:
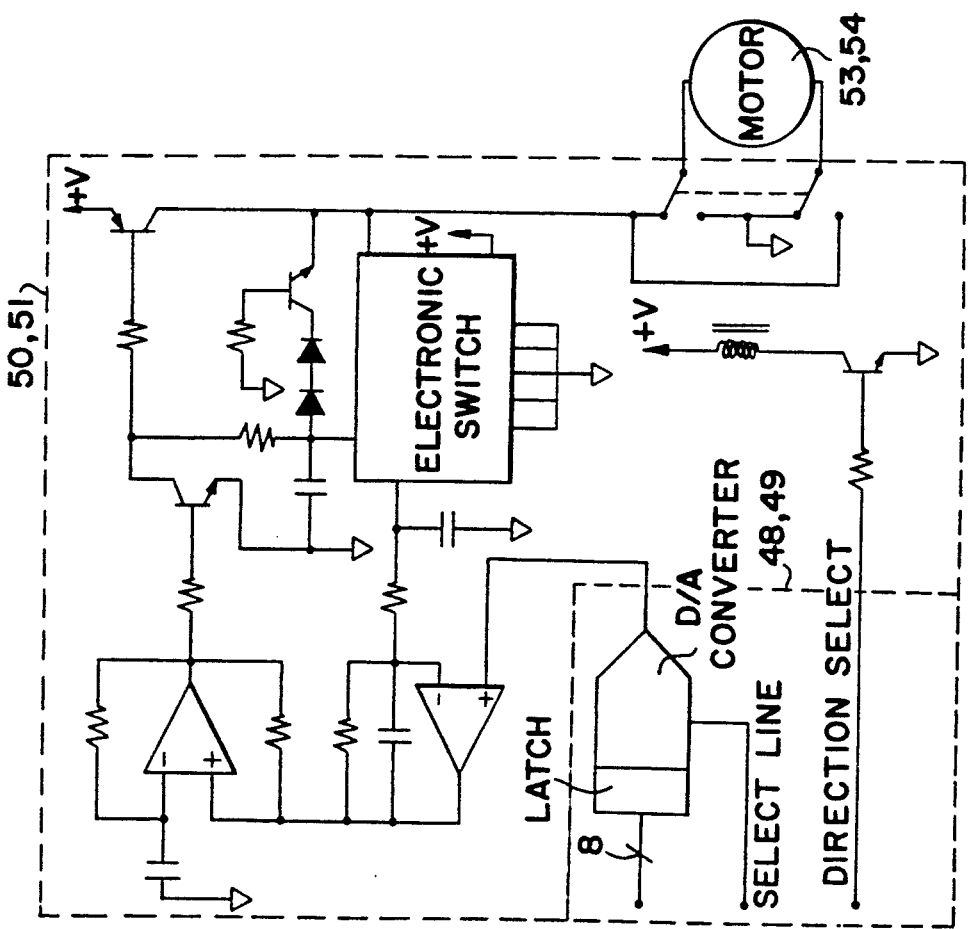
FIG. 8 is a schematic diagram of the PAN and TILT motor circuitry of the base unit.

Other outputs from controller 32 include the PAN and TILT motors 53 and 54 via respective controllers 50 and 51 (FIG. 8) and the ZOOM motor 55 with ZOOM IN and ZOOM OUT functions via "wide" and "tight" motor solenoids 52 (FIGS. 2, 9). FIG. 10 illustrates the switch control 34 for the camera 15.

Figure 11A:
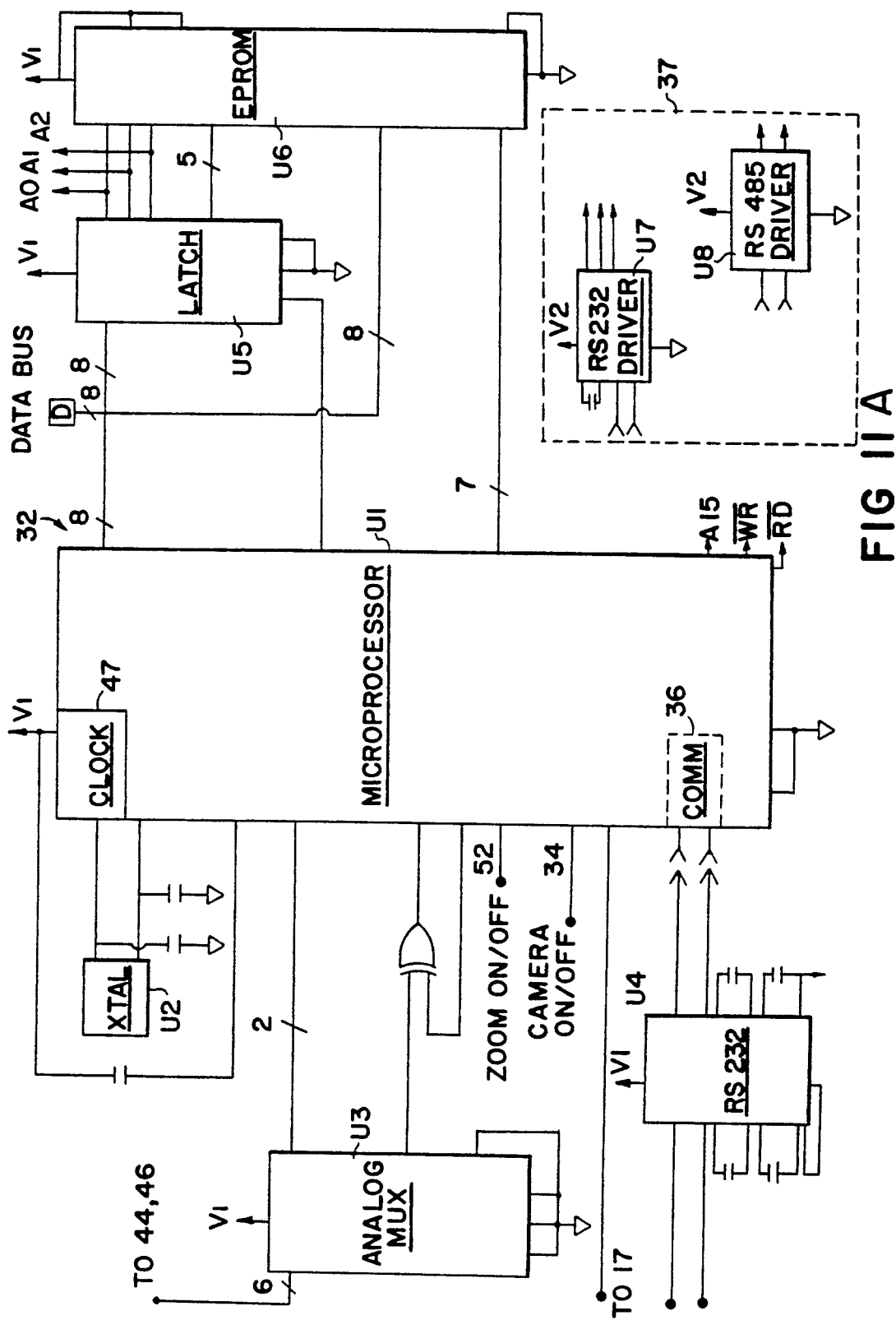
FIG. 11A and 11B are schematic diagrams of the controller circuitry.
Figure 11B:
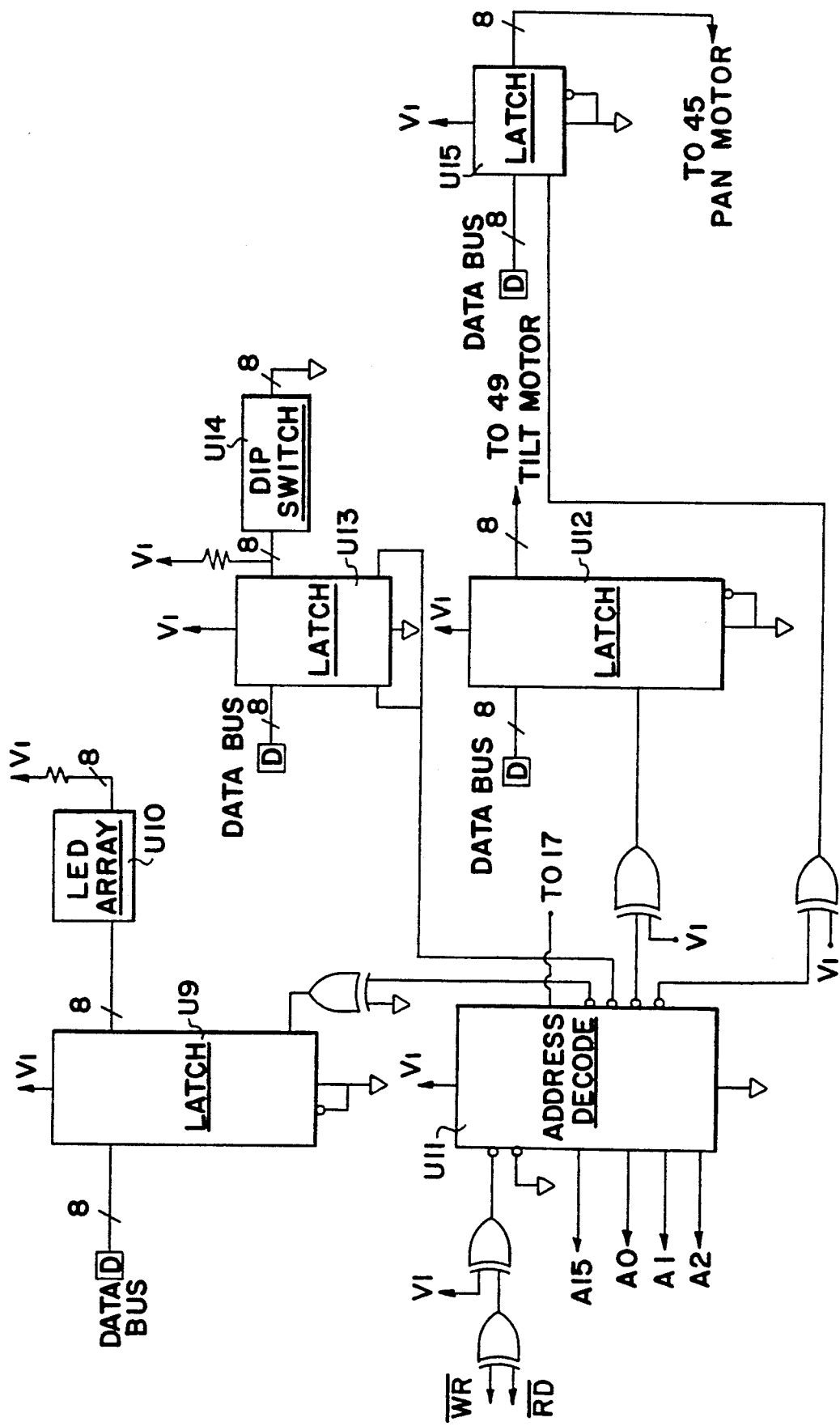
Figure 15:
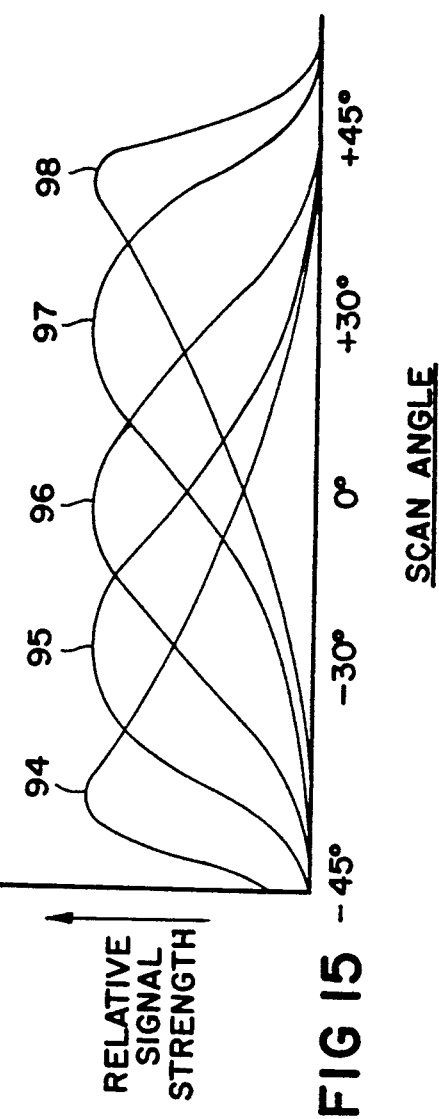
FIG. 15 is a diagram illustrating the scan angle of the infrared signal emitted by the assembly of FIGS. 4 and 5.

FIG. 11 illustrates the circuitry of controller 32. Microprocessor U1 is an 8-bit device driven via crystal U2 and supplying clock circuitry 47 and internal timers. U3 is an analog multiplexer supplying an output to IR LED selector 44 (FIG. 15). COMM circuitry 36 supplies U4, an RS-232 transceiver; U7, an RS-232 driver chip; or U8, an RS-485 driver chip that can be used for a BUS 1 connection to computer C1 as shown in FIGS. 2 and 17. U5 is an octal latch connecting to EPROM U6 in which the firmware programming for the system is placed. Point "D" indicates the microprocessor U1 DATA bus. The other connections to microprocess U1 include an octal latch U9 which connects to LED array U10 having indicators for (1) PAN tracking/not tracking; (2) TILT tracking/ not tracking; (3) camera ON/OFF; (4) FOLLOW/NOT FOLLOW; (5) ZOOM OUT ON/OFF; and (6) ZOOM IN ON/OFF. Dip switch U14 is connected to U13 and has switches for (1) camera ON time delay of 5 sec., 15 sec., 30 sec., or 60 sec. and OFF delay with the same values; and (2) tracking sensitivity of fast, medium fast, medium slow, or slow. Latches U12 and U15 connect to the motors as indicated. ADDRESS DECODE chip U11 is the interface to U1. The operation of controller 32 is in accord with the programming of EPROM U6.

Figure 12:
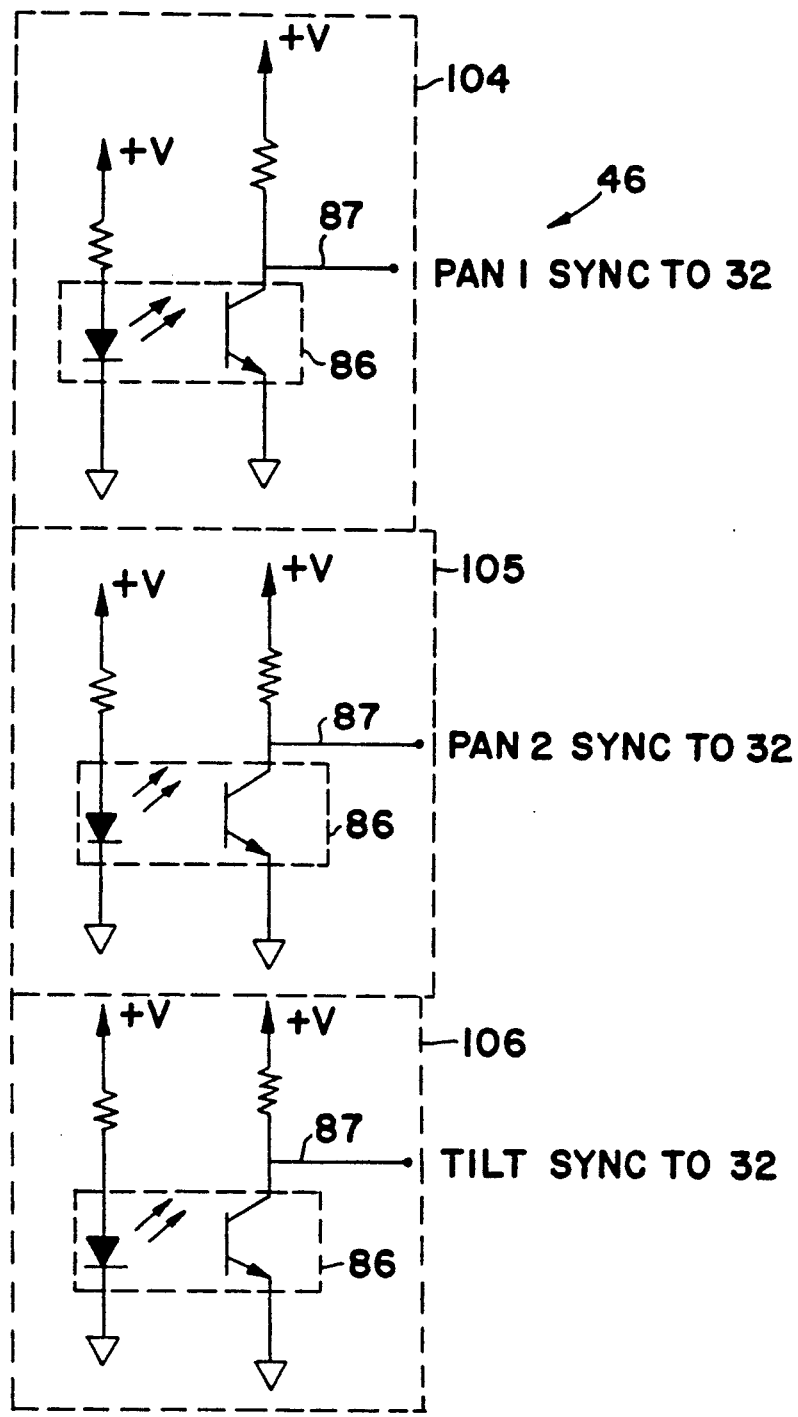
FIG. 12 is a schematic of the sensor circuitry of the position indication.

The position indication system 46 is illustrated in FIGS. 12 and 16. A conventional U-shaped LED and receiver unit 86 is mounted to detect the position of TAB 85 and provides a "leading edge" signal and "trailing edge" signal to controller 32. An internal timer in U1 will provide a time signal that measures the total scan time of a respective IR signal 13 as well as providing data indicating, in counts, precisely where the respective TAB 85 was during the point in a scan time interval when the remote unit 12 detects the scanning signal 13. Accordingly, the position of a lens 82 and the corresponding signal 13 with respect to any appropriate reference position or angle is known with great precision at all times during each scan. The detectors themselves are illustrated as 104-106 for PAN 1, PAN 2, TILT, respectively, and are conventional optical devices as understood in the art.

Figure 14:
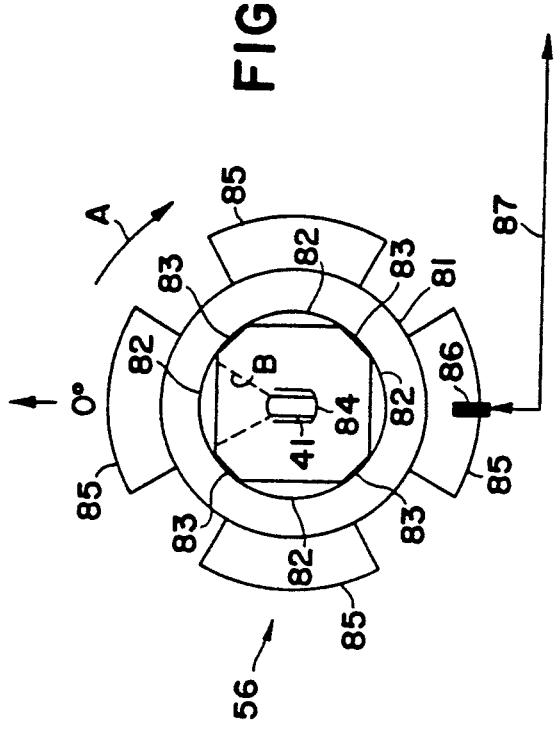
FIG. 14 is a top pictorial view of the infrared transmitter assembly of the base unit.

With respect now to FIG. 14, a top view of the PAN 1 transmitter assembly 56 is illustrated. A rotating disk 81 has a plurality of upstanding infrared lenses 82 mounted thereon. The spaces between the edges of a lens 82 contain upstanding IR "blinders" 83 to prevent infrared transmission therethrough. An IR LED 41 is mounted in a housing 84 which also serves to reduce the side lobes of the IR signal 13 which has a beam width as illustrated by dotted lines "B". Disk 81 with lens 82 and blinders 83 rotate in the direction of arrow "A" while IR LED 41 and housing 84 remain stationary.

Figure 5:
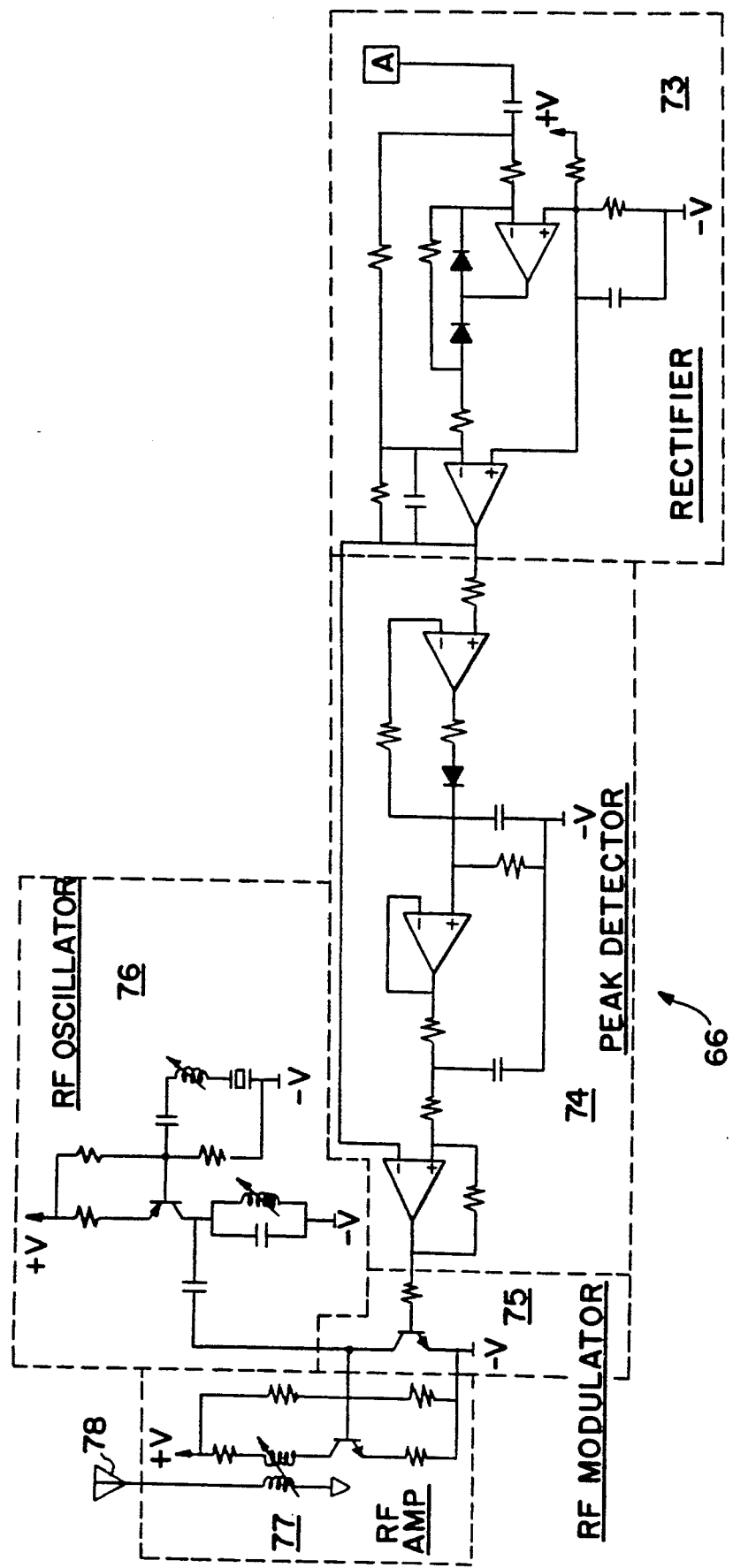
FIG. 5 is a partial schematic diagram of the remote unit of FIG. 1.
Figure 6:
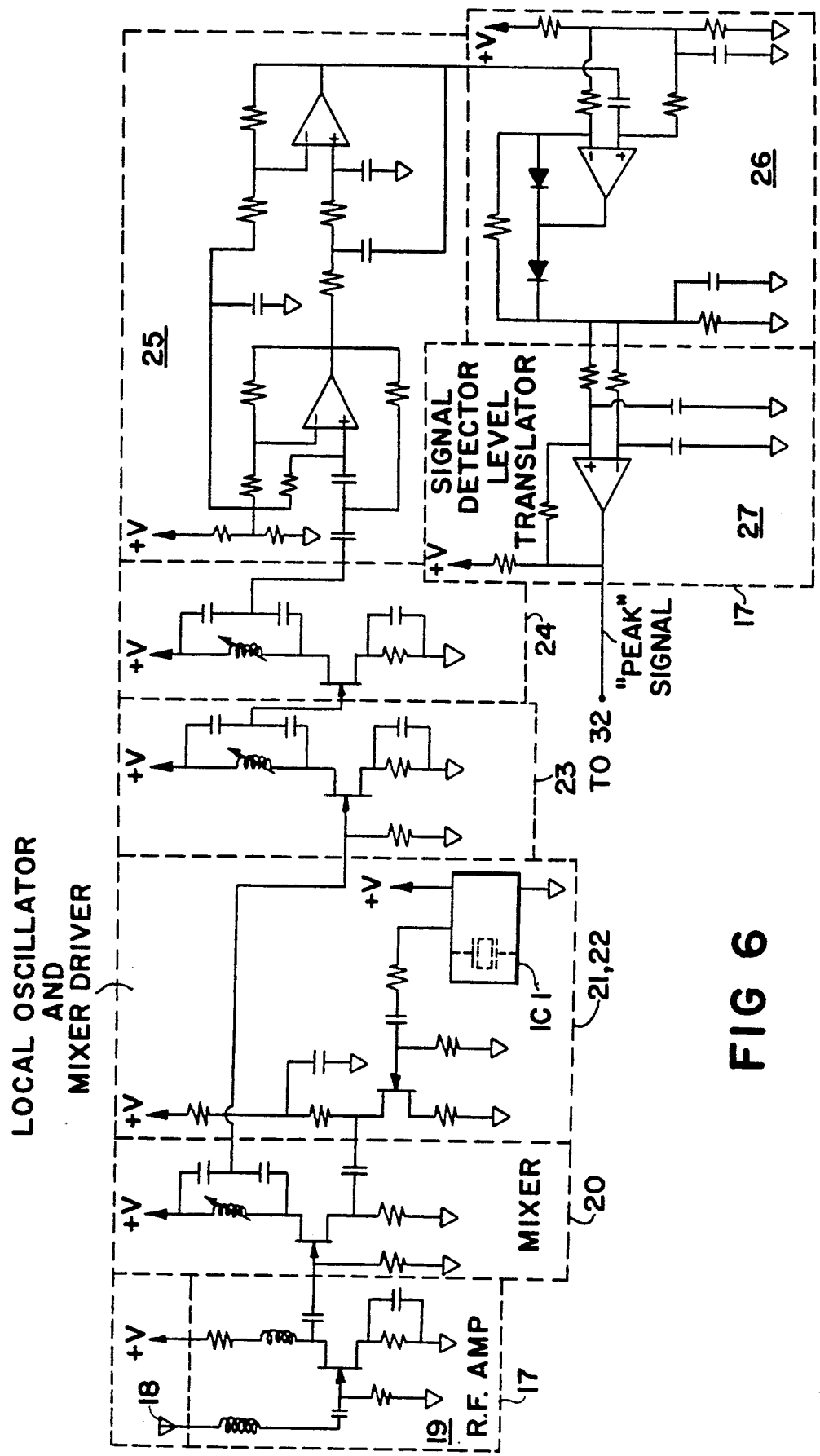
FIG. 6 is a schematic diagram of the RF receiver circuitry of the base unit of FIG. 1.

Position indication is accomplished by the use of tabs 85 mounted on the perimeter of disk 81 with position sensor 86 determining the beginning and end of a scan by detecting the leading and trailing edge of a tab 85 which is aligned with a respective lens 82. Position sensor 86 may be optical, magnetic, or mechanical in nature generally depending upon the desired rotational speed of disk 81. The sensor 86 provides an output on line 87 to the appropriate circuitry included in position indicator 46 (FIG. 2). Accordingly, the controller 32 will be provided data indicating the relative position of a lens 82 with respect to the transmitted IR signal 13. Disk 81 is rotated by any conventional means such as a motor 88 driving shaft 89 connected to pulley 91 via belt 90 which is in turn connected to plate 92 affixed to disk 81 as is well known in the art (FIG. 5). Post 93 provides support for housing 84. The entire assembly 56 is mounted to housing 16 by any appropriate connections. IR transmitter assemblies 57 and 58 are substantially identical in all respects to assembly 56.

FIG. 15 illustrates the scan of the IR signal 13 as a lens passes in front of IR LED 41. The peak signal will scan from left to right approximately 90°, or ±45° from the straight ahead orientation defined as 0° reference plane. Because position indicator 46 provides data on the exact position of a lens 82, the angle of the peak signal strength from the 0° reference plane is always known. Accordingly, when the remote unit 12 detects a signal peak and transmits this information to the base unit 11, the effective angle between the transmitter 41 and the IR receiver 67 can readily be calculated by simple algorithms by controller 32. This effective angle represents an error signal defined as the angular difference between the IR signal 13 at the 0° plane and the remote unit 12 which is being tracked. The controller 32 is programmed to supply control signals to the PAN and TILT motors in response to the respective developed error signals. For example, if the remote unit 12 is at an angle of approximately 40° to the left of the 0° plane of the base unit 11, the signal peak detected by the IR receiver circuitry 66 will be understood by the base unit 11 as being signal peak 94 because the reception of the "peak" signal via amplifier 29 is supplied to controller 32 as its position data. The same results obtain for signal peaks 95-98. As understood in the art, the beam width "B", the number and size of lenses 82 and the rotational speed of disk 81 can be selected to provide the appropriate signal strength, angular resolution, "scan" angle beam width and range that are desired in a particular circumstance.

The use of PAN 1 and PAN 2 assemblies 56 and 57 respectively, provide the controller 32 with data by which the range of the remote unit 12 from base unit 11 can be calculated by the usual trigonometric methods. This data can be used for control of ZOOM motor 55. The TILT IR assembly 58 functions in substantially the same manner as each of the PAN 1 and PAN 2 assemblies.

Figure 13:
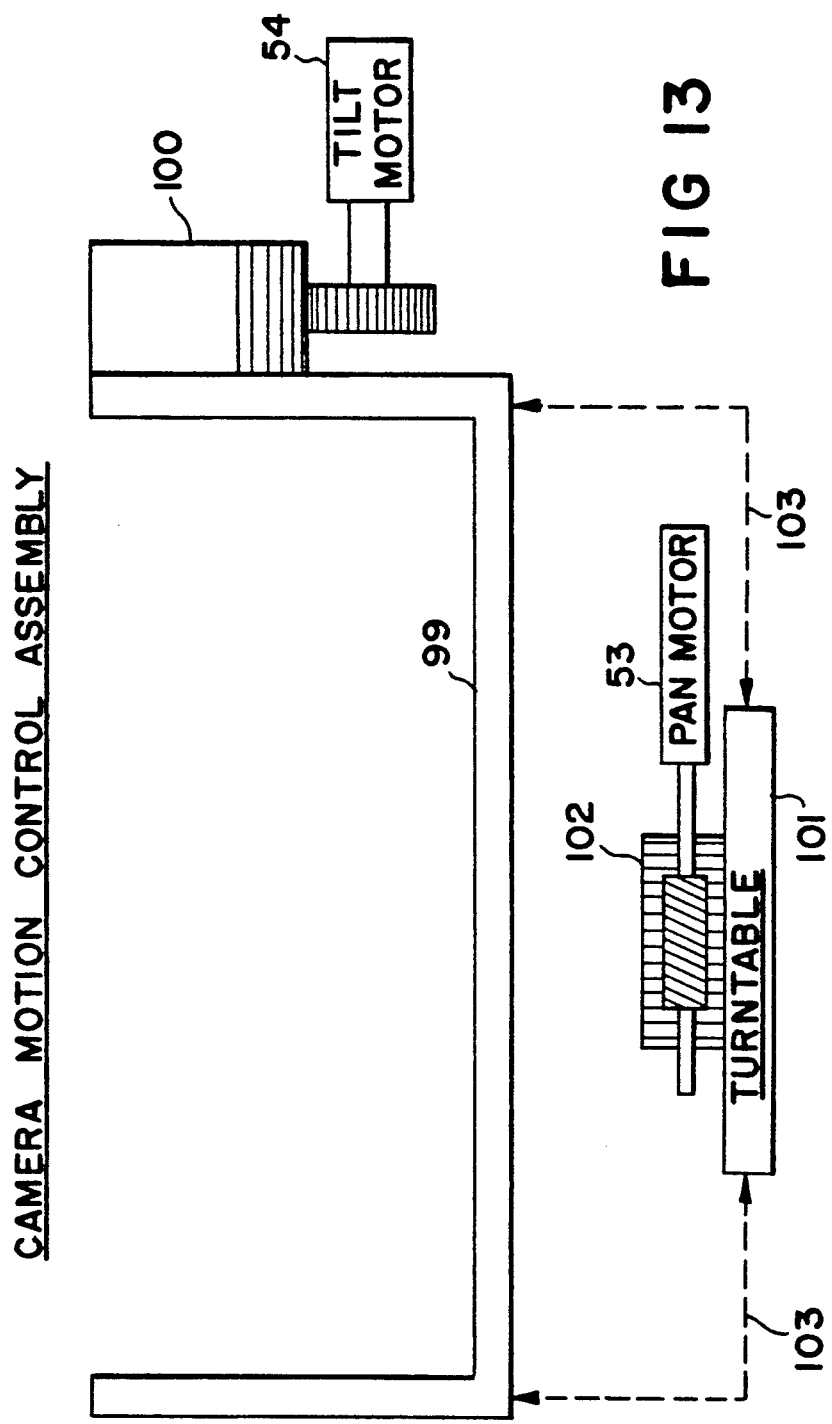
FIG. 13 is a pictorial diagram of the camera motion control apparatus.

The tracking system is designed principally for automatic tracking of remote unit 12 by base unit 11 via the PAN and TILT motors 53 and 54 as illustrated in FIG. 13. The camera 15 is mounted in elevation frame 99 which is tilted by gearing 100. 360° PAN movement via turntable 101 and gearing 102 connected to frame 99 by any appropriate means 103 completes the camera motion control by the base unit 11.

In the preferred embodiment of the present invention, each LED 41, 42, 43 actually consists of a group of four IR LEDs that are energized simultaneously as a single unit. This construction provides for an improved scanning signal and for greater vertical height of the PAN signals and greater horizontal width of the TILT signal. In addition, the receiver IR diode 67 can be used for both horizontal and vertical scanning and accordingly, only one receiver circuit 66 need be used. A receiver 66 may be used for each scanning signal employed if appropriate in the circumstances.

PROGRAMMING AND OPERATION

The system 10 has programs loaded into EPROM U6 for the following functions: (1) PAN tracking using either PAN 1 or PAN 2; (2) TILT tracking; (3) camera ON/OFF with delays of 5 sec., 15 sec., 30 sec. and 60 sec. in both ON and OFF; (4) operation of the adjustable field of view or ZOOM lens of a camera 15; (5) communication with external devices such as computer C1; (6) remote command execution via command signals from computer C1; (7) range calculation; and (8) tracking sensitivity of fast, medium fast, medium slow, and slow in both PAN and TILT functions.

Range calculation can be accomplished by using any two of the three transmitter systems of PAN 1, PAN 2, and TILT because the distance between the respective IR LED diodes 41, 42, 43 is known and placed in controller 32 memory.

The base unit controller 32 is programmed to be operable by the following commands from an external device such as computer C1: (1) OFFSET, wherein the base unit 11 will not be pointed directly at remote unit 12 but is programmed to track at an angular deviation a desired amount called the "OFFSET ANGLE". This feature can be used where a user has a remote unit 12 on his belt but desires that the base unit 11 keep the camera pointed at his face. This function can be used in both PAN and TILT directions; (2) FOLLOW/NOT FOLLOW where the base unit 11 can be instructed to remain fixed in position while the remote unit 12 is being moved. This feature can be advantageously employed when a user is showing a painting and desires to move out of the frame of the camera 15; (3) camera ON/OFF with time delays as already mentioned; (4) ZOOM, wherein motor 55 is operated in response to calculated range data.

Also stored in memory, either in U1 RAM or EPROM U6 is the total time a scan takes and the time interval during a scan where a peak is detected as measured in counts by a timer in U1. EPROM U6 contains all the necessary algorithms for computation of time, distance, directional movement and rate of change of direction in combination with U1 timers and appropriate clock circuitry 47.

SYSTEM OPERATION

Generally speaking, the remote tracking system 10 in accord with the present invention is to be used in an application wherein remote unit 12 is located in the vertical and/or horizontal plane using the usual trigonometric principles and tracked as it moves. Accordingly, an object in a known position with respect to the remote unit 12 can be tracked with respect to an object in a known position with respect to the base unit 11. The remote unit 12 is located by scanning an area with an infrared signal whose magnitude or signal strength level varies during a time interval. In the present invention, the scanning signal 13 is moved across the area via the movement of the lens 82 and is detected by the remote unit 12. The remote unit 12 includes an infrared diode circuit 67 which provides an output that follows the relative signal strength received. Peak detector 74 provides an output indicative of the "peak" or maximum level of IR signal level that is received. When this peak signal is supplied it turns RF modulator 75 of thus providing a broadcast RF signal 14 back to the base unit 11. This return signal indicates that a peak has been detected and, in conjunction with controller 32, the exact angle the scanning signal was at when the peak was detected at the remote unit 12 can be computed. These computations utilize the timer counts associated with the start and stop of a scan via TAB 85 with its angular position during the same time period as also expressed in timer counts established by calibration and initialization of the system 10.

The received signal is filtered and processed to provide a peak output signal used as an INTERRUPT at U1. U1 will provide appropriate output signals to operate the motors 53, 54, 55 in accord with the programming of the system.

Successive determinations of the angular displacement of the remote unit 12 with respect to base unit 11 can be accomplished in real time via clock 37 to provide for direction of movement and rate of change of direction of movement for control of the motors 53-55 in accord with U1 programming. These calculations can be made for the PAN and/or TILT functions for the respective horizontal and vertical planes which are scanned in an alternating series.

The reference angle or position of the base unit 11 can be established in any suitable manner and in the preferred embodiment of the present invention, is set head-on at 0° (FIG. 16). Departures from the reference angle can be considered "error signals" as understood in the art.

All of the electronic components and circuits used in the base unit 11 and remote unit 12 are conventional in nature and are selected on the basis of cost and physical size to minimize the size of the apparatus, particularly, remote unit 12, without detracting from reliability and efficiency.

As understood in the art, infrared receiver circuitry 66 and IR transmitter assembly 56-58 may be replaced with other energy sources such as Ultraviolet Light (UV) circuitry if cost considerations allow and nothing adverse to the camera's picture taking quality occurs. Further, the radio frequency transmitter assembly may be replaced with a hardwired communications link if appropriate in the circumstances.

Variations of the specific circuitry employed in the tracking system 10 will depend on the specific application. In particular, use of the tracking system 10 in a factory application for use with robots and machine vision technology may necessitate hardwired communications due to environmental interference. It may be desirable also to use other signals such as UV signals in the presence of other equipment utilizing IR signals that might interfere with system 10 operation.

The software used in the present system in machine code is attached hereto as Appendix "A".

While the invention has been described with respect to certain specific embodiments, it will be appreciated that many modifications and changes may be made by those skilled in the art without departing from the spirit of the invention. It is intended, therefore, by the appended claim's to cover all such modifications and changes as fall within the true spirit and scope of the invention.

file: CM.XXX    APPENDIX A

```
0000: 02 01 C8 02 00 53 00 00   00 00 00 02 00 26 00 00   .....S.. .....&..
0010: 00 00 00 02 00 86 00 00   00 00 00 02 01 C8 00 00   ........ ........
0020: 00 00 00 02 01 8D C0 D0   C0 E0 C0 00 C0 01 75 8A   ........ ......u.
0030: 00 75 8C 4C 78 90 79 03   E6 08 46 60 0A 18 E6 24   .u.Lx.y. ..F`...$
0040: FF F6 08 E6 34 FF F6 08   D9 EE D0 01 D0 00 D0 E0   ....4... ........
0050: D0 D0 32 C0 D0 C0 E0 C0   00 78 54 E2 30 E1 09 78   ..2..... .xT.0..x
0060: 34 E2 F2 78 80 F6 80 14   30 25 05 E5 56 B5 55 0C   4..x.... 0%..V.U.
0070: C2 8C 85 8A 2B 85 8C 2C   D2 8C D2 21 53 88 FD D0   ....+..,   ...!S....
0080: 00 D0 E0 D0 D0 32 C0 D0   C0 E0 C0 00 C0 01 C2 8C   .....2.. ........
0090: A8 8A A9 8C D2 8C 53 A8   FA 20 28 12 88 29 89 2A   ......S. . (..).*
00A0: C2 21 C2 24 D2 96 D2 28   43 A8 05 02 01 81 20 24   .!.$...( C..... $
00B0: 0A 30 25 0A E5 56 B5 55   02 80 03 02 01 69 E5 29   .0%..V.U .....i.)
00C0: 24 00 E5 2A 34 B4 40 06   75 29 DF 75 2A 4B C2 D5   $..*4.@. u).u*K..
00D0: E5 2B 24 00 E5 2C 34 B4   40 02 D2 D5 E5 2B C3 95   .+$..,4. @....+..
00E0: 29 F5 2B E5 2C 95 2A F5   2C 50 0F 20 D5 0C E5 2B   ).+.,.*. ,P. ...+
00F0: 24 00 F5 2B E5 2C 34 B4   F5 2C C2 D5 E8 24 00 E9   $..+.,4. .,...$..
0100: 34 B4 40 02 D2 D5 E8 C3   95 29 F8 E9 95 2A F9 50   4.@..... .)...*.P
0110: 0B 20 D5 08 E8 24 00 F8   E9 34 B4 F9 20 29 26 88   . ...$.. .4.. )&.
0120: 31 89 32 85 2B 2F 85 2C   30 D2 2A D2 32 78 92 76   1.2.+/., 0.*.2x.v
0130: 04 20 21 07 E4 F5 2F F5   30 C2 32 20 27 26 43 90   . !..../. 0.2 '&C.
0140: 20 D2 29 80 24 88 35 89   36 85 2B 33 85 2C 34 D2   .).$.5. 6.+3.,4.
0150: 2B D2 33 78 92 76 04 20   21 07 E4 F5 33 F5 34 C2   +.3x.v. !...3.4.
0160: 33 20 23 DA 53 90 CF C2   29 C2 96 C2 28 20 B3 06   3 #.S... )...( ..
0170: D2 96 D2 28 D2 24 43 A8   04 30 25 05 05 56 53 56   ...(.$C. .0%..VSV
0180: 03 53 88 F7 D0 01 D0 00   D0 E0 D0 D0 32 C0 D0 C0   .S...... ....2...
0190: E0 C0 00 10 98 06 10 99   14 02 01 C8 E5 78 24 96   ........ ....x$.
01A0: F8 E5 99 54 7F F6 05 78   53 78 1F 80 14 E5 77 B5   ...T...x Sx....w.
01B0: 78 05 C2 20 02 01 C1 24   96 F8 86 99 05 77 53 77   x.. ...$ .....wSw
01C0: 1F D0 00 D0 E0 D0 D0 32   E4 78 00 F2 78 01 F2 78   .......2 .x.x..x
01D0: FF 76 00 D8 FC 75 81 B6   75 90 F8 75 B0 FF 75 87   .v...u.. u..u..u.
01E0: 00 75 88 55 75 89 21 75   98 70 C2 96 53 90 CF 43   .u.Uu.!u .p..S..C
01F0: 90 00 75 B8 05 75 A8 97   75 8D F4 D2 2E 78 92 76   ..u..u.. u..u..x.v
0200: 04 78 02 E2 F5 27 12 0A   8D 74 13 78 04 F2 74 07   .x...'.. .t.x..t.
0210: F2 74 80 78 44 F2 74 88   78 14 F2 74 05 78 24 F2   .t.xD.t. x..t.x$.
0220: 74 02 78 54 F2 02 02 28   12 0B 4C 12 02 A6 12 03   t.xT...( ..L.....
0230: 98 12 04 88 12 0A BE 12   0A 82 12 0F 26 78 02 E2   ........ ....&x..
0240: F5 27 20 2F 51 78 92 E6   70 0E 20 29 04 D2 23 80   .' /Qx.. p. )..#.
0250: 02 D2 27 C2 24 12 00 86   30 23 02 C2 32 30 27 02   ..'.$... 0#..20'.
0260: C2 33 20 2D 04 C2 90 80   02 D2 90 20 31 04 C2 92   .3 -.... ... 1...
0270: 80 04 D2 92 C2 30 20 30   04 C2 91 80 02 D2 91 E5   ....0 0 ........
0280: 26 03 03 54 03 F8 E5 26   C4 54 30 48 F8 E5 25 C4   &..T...& .T0H..%.
0290: 23 54 0C 48 80 07 E5 2D   30 2C 02 E5 2E F5 28 F4   #T.H...- 0,....(.
02A0: 78 03 F2 02 02 28 20 23   03 20 2A 03 02 03 89 C2   x....( # . *....
02B0: 2A 79 2F 12 14 04 E5 0C   70 0B 78 4F 12 14 35 75   *y/..... p.xO..5u
02C0: 2D 00 02 03 89 90 13 C8   12 13 A2 12 13 07 79 31   -....... ......y1
02D0: 12 14 0B 12 12 F4 90 13   CE 12 13 A2 12 13 60 78   ........ ......`x
02E0: 08 79 37 12 14 2C 30 2E   D1 78 84 79 0E 12 14 2C   .y7..,0. .x.y..,
02F0: 12 13 19 78 08 79 37 12   14 2C 78 4F 79 0E 12 14   ...x.y7. .,xOy...
0300: 2C 12 13 19 E5 0C 24 7F   50 0E E5 0D C0 E0 90 13   ,.....$. P.......
0310: CE 12 13 9D D0 E0 F5 0D   78 08 79 4F 12 14 2C 78   ........ x.yO..,x
0320: 3D 79 08 12 14 2C 12 0B   37 78 37 79 0E 12 14 2C   =y...,.. 7x7y...,
0330: 12 13 07 78 08 79 18 12   14 2C 78 43 79 08 12 14   ...x.y.. .,xCy...
0340: 2C 90 13 DA 12 13 A2 12   13 07 78 4F 79 0E 12 14   ,....... ..xOy...
0350: 2C 12 13 07 78 18 79 0E   12 14 2C 12 13 19 78 08   ,...x.y. ..,...x.
0360: 79 49 12 14 2C D2 22 E5   0D 60 05 C2 22 75 0D 00   yI..,.". .`.."u..
0370: E5 0C 24 7F 50 05 75 2D   3F 80 0E 90 13 D4 12 13   ..$.P.u- ?.......
0380: A2 12 13 07 79 2D 12 11   8C 20 22 04 C2 6F 80 02   ....y-.. ."..o..
0390: D2 6F E5 2D 78 00 F2 22   20 27 03 20 2B 03 02 04   .o.-x.." '. +...
```

```
03A0: 79 79 33 12 14 04 E5 0C   70 0B 78 6D 12 14 35 75    yy3..... p.xm..5u
03B0: 2E 00 02 04 79 90 13 E0   12 13 A2 12 13 07 79 35    ....y... ......y5
03C0: 12 14 0B 12 12 F4 90 13   E6 12 13 A2 12 13 60 78    ........ ......`x
03D0: 08 79 55 12 14 2C 30 2E   D1 78 8A 79 0E 12 14 2C    .yU..,0. .x.y...,
03E0: 12 13 19 78 08 79 55 12   14 2C 78 6D 79 0E 12 14    ...x.yU. .,xmy...
03F0: 2C 12 13 19 E5 0C 24 7F   50 0E E5 0D C0 E0 90 13    ,.....$. P.......
0400: E6 12 13 9D D0 E0 F5 0D   78 08 79 6D 12 14 2C 78    ........ x.ym..,x
0410: 5B 79 08 12 14 2C 12 0B   37 78 55 79 0E 12 14 2C    [y...,.. 7xUy...,
0420: 12 13 07 78 08 79 18 12   14 2C 78 61 79 08 12 14    ...x.y.. .,xay...
0430: 2C 90 13 F2 12 13 A2 12   13 07 78 6D 79 0E 12 14    ,....... ..xmy...
0440: 2C 12 13 07 78 18 79 0E   12 14 2C 12 13 19 78 08    ,...x.y. ..,...x.
0450: 79 67 12 14 2C D2 26 E5   0D 60 05 C2 26 75 0D 00    yg..,.&. .`..&u..
0460: E5 0C 24 7F 50 05 75 2E   3F 80 0E 90 13 EC 12 13    ..$.P.u. ?.......
0470: A2 12 13 07 79 2E 12 11   8C 20 26 04 C2 77 80 02    ....y... . &..w..
0480: D2 77 E5 2E 78 01 F2 22   20 2B 01 22 C2 2B E5 2D    .w..x.." +."+.-
0490: 24 F8 40 F7 79 33 12 14   04 E5 0C 60 EE 79 35 12    $.@.y3.. ...`.y5.
04A0: 14 0B 12 12 F4 90 13 F8   12 13 A2 12 13 07 15 0D    ........ ........
04B0: 90 13 F8 12 13 A2 12 13   19 79 0E 12 10 77 E7 70    ........ .y...w.p
04C0: CA 19 E7 24 1F 40 C4 E7   25 5C F5 5C E5 5D 34 00    ...$.@.. %\.\.]4.
04D0: F5 5D 05 5E 53 5E 03 E5   5E 70 60 E5 5D 13 F5 5D    .].^S^.. ^p`.]..]
04E0: E5 5C 13 F5 5C E5 5D 13   75 5D 00 E5 5C 13 75 5C    .\..\.]. u]..\.u\
04F0: 00 F5 5B F5 82 75 83 00   C3 E5 82 33 F5 82 E5 83    ..[..u.. ...3....
0500: 33 F5 83 C0 82 C0 83 E5   82 33 F9 E5 83 33 C9 D0    3....... .3...3..
0510: 83 D0 82 25 82 F5 82 E5   83 39 F5 83 E5 82 24 3C    ...%.... .9....$<
0520: F5 82 E5 83 34 05 F5 83   12 13 9D 90 13 FE 12 13    ....4... ........
0530: A2 12 13 07 78 08 79 5F   12 14 2C 22 99 79 82 9A    ....x.y_ ..,".y..
0540: 81 00 45 90 46 9B 81 00   E1 51 0C 9C 81 00 35 C4    ..E.F... .Q....5.
0550: D3 9C 81 00 25 ED 9C 9D   81 00 B0 D2 67 9E 81 00    ....%... ....g...
0560: EF 7A 34 9F 81 00 1B EC   02 A0 81 00 86 2C D3 A0    .z4..... .....,..
0570: 81 00 A4 42 A5 A1 81 00   05 35 79 A2 81 00 5B 0A    ...B.... .5y...[.
0580: 4F A3 81 00 76 C9 26 A4   81 00 47 79 00 A5 81 00    O...v.&. ..Gy....
0590: E2 20 DC A5 81 00 7C C7   B9 A6 81 00 6E 74 99 A7    . ....|. ....nt..
05A0: 81 00 35 2F 7B A8 81 00   74 FF 5E A9 81 00 F3 EC    ..5/{... t.^.....
05B0: 44 AA 81 00 A1 FF 2C AB   81 00 94 3F 17 AC 81 00    D.....,. ...?....
05C0: 0C B5 03 AD 81 00 73 68   F2 AD 81 00 5C 62 E3 AE    ......sh ....\b..
05D0: 81 00 87 AB D6 AF 81 00   E3 4C CC B0 81 00 89 4F    ........ .L.....O
05E0: C4 B1 81 00 C5 BC BE B2   81 00 12 9E BB B3 81 00    ........ ........
05F0: 1C FD BA B4 81 00 C4 E3   BC B5 81 00 1D 5C C1 B6    ........ .....\..
0600: 81 00 72 70 C8 B7 81 00   44 2B D2 B8 81 00 4D 97    ..rp.... D+....M.
0610: DE B9 81 00 80 BF ED BA   81 00 0D AF FF BB 81 00    ........ ........
0620: 60 71 14 BD 81 00 26 12   2C BE 81 00 4B 9D 46 BF    `q....&. ,...K.F.
0630: 81 00 FC 1E 64 C0 81 00   AD A3 84 C1 81 00 17 38    ....d... .......8
0640: A8 C2 81 00 39 E9 CE C3   81 00 5E C4 F8 C4 81 00    ....9... ..^.....
0650: 1E D7 25 C6 81 00 5D 2F   56 C7 81 00 4F DB 89 C8    ..%...]/ V...O...
0660: 81 00 7D E9 C0 C9 81 00   C4 68 FB CA 81 00 57 68    ..}..... .h....Wh
0670: 39 CC 81 00 C4 F7 7A CD   81 00 F7 26 C0 CE 81 00    9.....z. ...&....
0680: 3A 06 09 D0 81 00 38 A6   55 D1 81 00 03 18 A6 D2    :.....8. U.......
0690: 81 00 14 6D FA D3 81 00   4F B7 52 D5 81 00 07 09    ...m.... O.R.....
06A0: AF D6 81 00 00 75 0F D8   81 00 73 0E 74 D9 81 00    .....u.. ..s.t...
06B0: 14 E9 DC DA 81 00 0F 19   4A DC 81 00 15 B3 BB DD    ........ J.......
06C0: 81 00 59 CC 31 DF 81 00   97 7A AC E0 81 00 18 D4    ..Y.1... .z......
06D0: 2B E2 81 00 B5 EF AF E3   81 00 DE E4 38 E5 81 00    +....... ....8...
06E0: 9F CB C6 E6 81 00 A3 BC   59 E8 81 00 38 D1 F1 E9    ........ Y...8...
06F0: 81 00 59 23 8F EB 81 00   B2 CD 31 ED 81 00 A1 EB    ..Y#.... ..1.....
0700: D9 EE 81 00 44 99 87 F0   81 00 79 F3 3A F2 81 00    ....D... ..y.:...
0710: EA 17 F4 F3 81 00 0D 25   B3 F5 81 00 33 3A 78 F7    .......% ....3:x.
0720: 81 00 89 77 43 F9 81 00   23 FE 14 FB 81 00 04 F0    ...wC... #.......
0730: EC FC 81 00 26 70 CB FE   81 00 41 51 58 80 82 00    ....&p.. ..AQX...
0740: 0E 56 4E 81 82 00 84 D9   47 82 82 00 3C EF 44 83    .VN..... G...<.D.
0750: 82 00 63 AB 45 84 82 00   BE 22 4A 85 82 00 B1 6A    ..c.E... ."J....j
0760: 52 86 82 00 45 99 5E 87   82 00 2D C5 6E 88 82 00    R...E.^. ..-.n...
0770: D0 05 83 89 82 00 4A 73   9B 8A 82 00 79 26 B8 8B    ......Js ....y&..
0780: 82 00 00 39 D9 8C 82 00   52 C5 FE 8D 82 00 B8 E6    ...9.... R.......
0790: 28 8F 82 00 5C B9 57 90   82 00 4E 5A 8B 91 82 00    (...\.W. ..NZ....
07A0: 92 E7 C3 92 82 00 28 80   01 94 82 00 15 44 44 95    ......(. .....DD.
07B0: 82 00 71 54 8C 96 82 00   6F D3 D9 97 82 00 6B E4    ..qT.... o.....k.
07C0: 2C 99 82 00 F7 AB 85 9A   82 00 E9 4F E4 9B 82 00    ,....... ...O....
07D0: 65 F7 48 9D 82 00 F2 CA   B3 9E 82 00 83 F4 24 A0    e.H..... ......$.
07E0: 82 00 8C 9F 9C A1 82 00   12 F9 1A A3 82 00 BE 2F    ........ ......./
07F0: A0 A4 82 00 ED 73 2C A6   82 00 C8 F7 BF A7 82 00    .....s,. ........
0800: 57 EF 5A A9 82 00 9B 90   FD AA 82 00 A2 13 A8 AC    W.Z..... ........
0810: 82 00 A0 B2 5A AE 82 00   10 AA 15 B0 82 00 C8 38    ....Z... .......8
0820: D9 B1 82 00 1D A0 A5 B3   82 00 02 24 7B B5 82 00    ........ ...${...
0830: 27 0B 5A B7 82 00 1F 9F   42 B9 82 00 85 2C 35 BB    '.Z..... B....,5.
```

```
0840: 82 00 28 03 32 BD 82 00   30 76 39 BF 82 00 50 DC    ..(.2...  0v9...P.
0850: 4B C1 82 00 F6 8F 69 C3   82 00 7E EF 92 C5 82 00    K.....i.  ..~.....
0860: 6A 5D C8 C7 82 00 9D 40   0A CA 82 00 9A 04 59 CC    j].....@  ......Y.
0870: 82 00 C5 19 B5 CE 82 00   B0 F5 1E D1 82 00 63 13    ........  ......c.
0880: 97 D3 82 00 B0 F3 1D D6   82 00 8B 1D B4 D8 82 00    ........  ........
0890: 6B 1E 5A DB 82 00 AC 8A   10 DE 82 00 FD FD D7 E0    k.Z.....  ........
08A0: 82 00 D8 1B B1 E3 82 00   FB 8F 9C E6 82 00 F5 0E    ........  ........
08B0: 9B E9 82 00 B6 56 AD EC   82 00 2B 2F D4 EF 82 00    .....V..  ..+/....
08C0: ED 6A 10 F3 82 00 F7 E7   62 F6 82 00 6B 90 CC F9    .j......  b...k...
08D0: 82 00 71 5B 4E FD 82 00   0D A7 74 80 83 00 33 3E    ..q[N...  ..t...3>
08E0: 4F 82 83 00 28 85 37 84   83 00 81 16 2E 86 83 00    O...(.7.  ........
08F0: 0F 96 33 88 83 00 8F B1   48 8A 83 00 6F 21 6E 8C    ..3.....  H...o!n.
0900: 83 00 A5 A9 A4 8E 83 00   97 1A ED 90 83 00 1C 52    ........  .......R
0910: 48 93 83 00 9B 3C B7 95   83 00 38 D6 3A 98 83 00    H....<..  ..8.:...
0920: 35 2C D4 9A 83 00 60 5E   84 9D 83 00 BE A0 4C A0    5,....`^  ......L.
0930: 83 00 53 3D 2E A3 83 00   20 96 2A A6 83 00 65 27    ..S=....   .*...e'
0940: 43 A9 83 00 10 8A 79 AC   83 00 84 76 CF AF 83 00    C.....y.  ...v....
0950: B2 C7 46 B3 83 00 85 7E   E1 B6 83 00 CB C5 A1 BA    ..F....~  ........
0960: 83 00 8B F6 89 BE 83 00   F4 9C 9C C2 83 00 EA 7D    ........  .......}
0970: DC C6 83 00 56 9D 4C CB   83 00 4C 45 F0 CF 83 00    ....V.L.  ..LE....
0980: 36 0E CB D4 83 00 27 E8   E0 D9 83 00 88 25 36 DF    6.....'.  .....%6.
0990: 83 00 6B 87 CF E4 83 00   B3 4B B2 EA 83 00 82 3D    ..k.....  .K.....=
09A0: E4 F0 83 00 55 C8 6B F7   83 00 41 0E 50 FE 83 00    ....U.k.  ..A.P...
09B0: 07 81 CC 82 84 00 F4 C2   A7 84 84 00 D1 C7 BE 8A    ........  ........
09C0: 84 00 E5 29 17 8F 84 00   89 3C B7 93 84 00 FD 2A    ...)....  .<.....*
09D0: A6 98 84 00 A9 1D EC 9D   84 00 49 67 92 A3 84 00    ........  ..Ig....
09E0: 30 BC A3 A9 84 00 4C 76   2C B0 84 00 6E E9 3A B7    0.....Lv  ,...n.:.
09F0: 84 00 B9 CC DF BE 84 00   7F BF 2E C7 84 00 69 F2    ........  ......i.
0A00: 3E D0 84 00 EB 00 2C DA   84 00 F6 0B 17 E5 84 00    >.....,.  ........
0A10: EF 2D 28 F1 84 00 AB 6A   90 FE 84 00 34 27 C6 86    .-(....j  ....4'..
0A20: 85 00 3D C4 33 8F 85 00   79 FB C0 98 85 00 F2 6D    ..=.3...  y......m
0A30: AB A3 85 00 2D B3 43 B0   85 00 DB 3F F5 BE 85 00    ....-.C.  ...?....
0A40: D5 9B 52 D0 85 00 B3 EB   28 E5 85 00 C1 80 A0 FE    ..R.....  (.......
0A50: 85 00 78 EA 3A 8F 86 00   5F AF B1 A3 86 00 7D 9C    ..x.:...  _.....}.
0A60: FA BE 86 00 8C 63 2D E5   86 00 01 B4 3C 8F 87 00    .....c-.  ....<...
0A70: A3 F3 FB BE 87 00 63 26   3D 8F 88 00 FB 42 3D 8F    ......c&  =....B=.
0A80: 89 00 78 94 E5 26 54 0C   20 2D 0E 70 04 E5 27 80    ..x..&T.   -.p..'.
0A90: 16 E6 08 46 70 1F D2 2D   22 70 08 E6 08 46 70 15    ...Fp..-  "p...Fp.
0AA0: C2 2D 22 E5 27 03 03 54   03 23 F9 90 0A B6 93 F6    .-".'..T  .#......
0AB0: 08 09 E9 93 F6 22 64 00   2C 01 58 02 B0 04 78 80    ....."d.  ,.X...x.
0AC0: E4 C6 60 72 F8 B4 31 04   63 25 20 22 B4 32 04 63    ..`r..1.  c% ".2.c
0AD0: 25 40 22 B4 33 04 63 26   01 22 B4 34 04 63 26 02    %@".3.c&  .".4.c&.
0AE0: 22 B4 35 2C D2 34 78 84   12 14 35 78 8A 12 14 35    ".5,.4x.  ..5x...5
0AF0: 20 2E 43 78 37 79 84 12   14 2C 78 89 E6 F4 F6 78     .Cx7y..  .,x....x
0B00: 55 79 8A 12 14 2C 78 8F   E6 F4 F6 D2 2E C2 34 22    Uy...,x.  ......4"
0B10: B4 36 03 D2 35 22 24 BF   F9 54 F0 70 05 78 81 E9    .6..5"$.  .T.p.x..
0B20: F6 22 E8 24 9F F9 54 F0   70 05 78 82 E9 F6 22 30    ."..$.T.  p.x..."0
0B30: 34 04 C2 2E C2 34 22 E5   27 C4 54 03 60 0D 04 79    4....4".  '.T.`..y
0B40: 15 77 00 19 F7 12 14 0B   12 12 F4 22 20 20 0C E5    .w......  ..."  ..
0B50: 77 B5 78 0D 78 90 E6 08   46 70 05 75 76 00 D2 AC    w.x.x...  Fp.uv...
0B60: 22 24 96 F8 05 77 53 77   1F 79 90 77 58 09 77 02    "$...wSw  .y.wX.w.
0B70: E5 76 70 06 B6 01 E4 05   76 22 B4 01 0A 12 10 16    .vp.....  v"......
0B80: 40 D9 B5 73 D6 80 F0 B4   02 3C 12 10 16 40 CC 23    @..s....  .<...@.#
0B90: C0 E0 90 0B A6 93 F5 75   D0 E0 04 93 F5 74 85 77    .......u  .....t.w
0BA0: 79 85 77 7A 80 D1 0B ED   0C 19 0C 3C 0C 6B 0C B4    y.wz....  ...<.k..
0BB0: 0C FB 0D 1E 0D 4D 0D 96   0D DD 0D E0 0E 4B 0E AF    .....M..  .....K..
0BC0: 0E CB 0E F4 0F 1D 05 7A   53 7A 1F E5 7A B5 79 03    .......z  Sz.z.y.
0BD0: 02 0B 5B B6 0D A1 C2 AC   E5 79 24 96 F8 85 74 82    ..[.....  .y$...t.
0BE0: 85 75 83 E4 73 D2 20 75   99 00 02 0B 5B 78 96 76    .u..s. u  ....[x.v
0BF0: 3A 08 E5 5B 12 0F A5 76   3A 08 C0 00 78 5F 79 08    :..[...v  :...x_y.
0C00: 12 14 2C D0 00 12 11 B1   76 0D 08 76 0A C3 E8 94    ..,.....  v..v....
0C10: 95 F5 78 75 77 00 02 0B   E5 78 96 76 3A 08 79 2F    ..xuw...  .x.v:.y/
0C20: 12 0F C4 76 3A 08 79 31   12 0F C4 76 3A 08 C0 00    ...v:.y1  ...v:...
0C30: 78 37 79 08 12 14 2C D0   00 02 0C 05 78 96 76 3A    x7y,,.  ....x.v:
0C40: 08 C0 00 78 37 79 08 12   14 2C D0 00 12 11 B1 76    ...x7y..  .,....v:
0C50: 3A 08 C0 00 78 49 79 08   12 14 2C D0 00 12 11 B1    :...xIy.  .,....v
0C60: 76 3A 08 E5 2D 12 0F A5   02 0C 08 E6 64 2C 60 03    v:.-...   ....d,`.
0C70: 02 0B 5B 08 12 10 A5 C0   00 78 08 79 3D 12 14 2C    ..[......  .x.y=..,
0C80: D0 00 B6 2C EB 08 12 10   A5 78 08 79 43 12 14 2C    ...,.....  .x.yC..,
0C90: 78 96 76 3A 08 C0 00 78   3D 79 08 12 14 2C D0 00    x.v:...x  =y...,..
0CA0: 12 11 B1 76 3A 08 C0 00   78 43 79 08 12 14 2C D0    ...v:...  xCy...,.
0CB0: 00 02 0C 05 E6 64 2C 60   03 02 0B 5B 08 E6 64 53    .....d,`  ...[..dS
0CC0: 70 04 C2 2C 80 28 E6 64   4C 70 06 D2 23 C2 22 80    p..,.(.d  Lp..#.".
0CD0: 0D E6 64 52 70 06 D2 23   D2 22 80 02 C2 23 08 B6    ..dRp..#  ."...#..
```

```
0CE0: 2C D7 08 79 08 12 0F 54   85 08 2D 53 2D 3F 78 96    ,..y...T ..-S-?x.
0CF0: 76 3A 08 E5 2D 12 0F A5   02 0C 08 78 96 76 3A 08    v:..-... ...x.v:.
0D00: 79 33 12 0F C4 76 3A 08   79 35 12 0F C4 76 3A 08    y3...v:. y5...v:.
0D10: C0 00 78 55 79 08 12 14   2C D0 00 02 0C 05 78 96    ..xUy... ,.....x.
0D20: 76 3A 08 C0 00 78 55 79   08 12 14 2C D0 00 12 11    v:...xUy ...,....
0D30: B1 76 3A 08 C0 00 78 67   79 08 12 14 2C D0 00 12    .v:...xg y...,...
0D40: 11 B1 76 3A 08 E5 2E 12   0F A5 02 0C 08 E6 64 2C    ..v:.... ......d,
0D50: 60 03 02 0B 5B 08 12 10   A5 C0 00 78 08 79 5B 12    `...[... ...x.y[.
0D60: 14 2C D0 00 B6 2C EB 08   12 10 A5 78 08 79 61 12    .,...,.. ...x.ya.
0D70: 14 2C 78 96 76 3A 08 C0   00 78 5B 79 08 12 14 2C    .,x.v:.. .x[y...,
0D80: D0 00 12 11 B1 76 3A 08   C0 00 78 61 79 08 12 14    .....v:. ..xay...
0D90: 2C D0 00 02 0C 05 E6 64   2C 60 03 02 0B 5B 08 E6    ,......d ,...[...
0DA0: 64 53 70 04 D2 2C 80 28   E6 64 44 70 06 D2 27 C2    dSp..,.( .dDp..'.
0DB0: 26 80 0D E6 64 55 70 06   D2 27 D2 26 80 02 C2 27    &...dUp. .'.&...'
0DC0: 08 B6 2C D7 08 79 08 12   0F 54 85 08 2E 53 2E 3F    ..,..y.. .T...S.?
0DD0: 78 96 76 3A 08 E5 2E 12   0F A5 02 0C 08 E6 64 2C    x.v:.... ......d,
0DE0: 60 03 02 0B 5B 08 C2 25   B6 44 02 D2 25 08 B6 2C    `...[..% .D..%..,
0DF0: F1 08 79 08 12 0F 54 85   08 55 78 96 76 3A 08 E5    ..y...T. .Ux.v:..
0E00: 55 12 0F A5 02 0C 08 E6   64 2C 60 03 02 0B 5B 08    U....... d,`...[.
0E10: B6 31 19 08 B6 2C F5 08   12 10 16 40 EF C4 54 E0    .1...,.. ...@..T.
0E20: 62 25 08 12 10 16 40 E4   54 03 62 26 78 96 76 3A    b%....@. T.b&x.v:
0E30: 08 79 24 7A 05 E7 C4 12   10 39 F6 08 E7 12 10 39    .y$z.... .9.....9
0E40: F6 08 76 3A 08 09 DA ED   02 0C 08 E6 64 2C 60 03    ..v:.... ....d,`.
0E50: 02 0B 5B 08 B6 31 2D D2   34 78 84 12 14 35 78 8A    ..[..1-. 4x...5x.
0E60: 12 14 35 20 2E 25 78 37   79 84 12 14 2C 78 89 E6    ..5 .%x7 y...,x..
0E70: F4 F6 78 55 79 8A 12 14   2C 78 8F E6 F4 F6 D2 2E    ..xUy... ,x......
0E80: C2 34 80 07 30 34 04 C2   2E C2 34 78 96 76 3A 08    .4..04.. ..4x.v:.
0E90: C0 00 78 84 79 08 12 14   2C D0 00 12 11 B1 76 3A    ..x.y... ,.....v:
0EA0: 08 C0 00 78 8A 79 08 12   14 2C D0 00 02 0C 05 E6    ...x.y.. .,......
0EB0: 64 2C 60 03 02 0B 5B 08   B6 31 02 D2 35 78 96 76    d,`...[. .1..5x.v
0EC0: 3A 08 79 83 E7 12 0F A5   02 0C 08 E6 64 2C 60 03    :.y..... ....d,`.
0ED0: 02 0B 5B 08 B6 31 0D 08   B6 2C F5 08 12 10 16 40    ..[..1.. .,.....@
0EE0: EF 78 81 F6 78 96 76 3A   08 79 81 E7 12 10 39 F6    .x..x.v: .y....9.
0EF0: 08 02 0C 08 E6 64 2C 60   03 02 0B 5B 08 B6 31 0D    .....d,` ...[..1.
0F00: 08 B6 2C F5 08 12 10 16   40 EF 78 82 F6 78 96 76    ..,..... @.x..x.v
0F10: 3A 08 79 82 E7 12 10 39   F6 08 02 0C 08 85 79 77    :.y....9 ......yw
0F20: 85 7A 78 02 0B E5 30 35   09 C2 35 78 5B E6 78 83    .zx...05 ..5x[.x.
0F30: F6 22 78 82 E6 60 F7 12   15 69 78 83 E6 60 14 12    ."x..`.. .ix..`..
0F40: 15 71 12 14 8C 78 09 E6   70 05 D2 30 C2 31 22 D2    .q...x.. p..0.1".
0F50: 31 C2 30 22 7B 05 E4 F7   09 F7 19 C2 D5 E6 64 2B    1.0"{... ......d+
0F60: 60 06 E6 B4 2D 03 D2 D5   08 E6 24 D0 50 27 E6 24    `...-... ..$.P'.$
0F70: C6 40 22 E7 75 F0 0A A4   C0 F0 F7 09 E7 75 F0 0A    .@".u... .....u..
0F80: A4 D0 F0 25 F0 F7 19 E6   24 D0 27 F7 09 E7 34 00    ...%.... $.'...4.
0F90: F7 19 08 DB D4 30 D5 0C   E7 F4 24 01 F7 09 E7 F4    .....0.. ..$.....
0FA0: 34 00 F7 19 22 F5 14 F7   15 00 80 20 09 E7 19 30    4..."... ... ...0
0FB0: E7 12 76 2D 08 E7 F4 24   01 F5 14 09 E7 F4 34 00    ..v-...$ ......4.
0FC0: F5 15 80 07 E7 F5 14 09   E7 F5 15 19 C0 02 75 16    ........ ......u.
0FD0: 00 75 17 00 7F 05 C0 00   C0 01 78 14 79 08 12 15    .u...... ..x.y...
0FE0: 54 75 0E 0A 75 0F 00 75   10 00 75 11 00 12 14 B3    Tu..u..u ..u.....
0FF0: D0 01 D0 00 E5 08 C0 E0   DF DC 7F 05 C2 D5 D0 E0    ........ ........
1000: 20 D5 02 60 06 24 30 F6   08 D2 D5 DF F1 20 D5 03     ..`.$0. ..... ..
1010: 76 30 08 D0 00 02 22 E6   24 D0 50 1C E6 24 C6 40    v0....". $.P..$.@
1020: E6 24 D0 80 10 E6 54 5F   F6 24 BF 50 0A E6 24 B9    .$....T_ .$.P..$.
1030: 40 05 E6 24 C9 C3 22 D3   22 54 0F 90 10 40 93 22    @..$..". "T...@."
1040: 30 31 32 33 34 35 36 37   38 39 41 42 43 44 45 46    01234567 89ABCDEF
1050: 43 4F 50 59 52 49 47 48   54 20 28 63 29 20 31 39    COPYRIGH T (c) 19
1060: 39 30 20 62 79 20 50 41   52 4B 45 52 56 49 53 49    90 by PA RKERVISI
1070: 4F 4E 20 49 4E 43 2E 78   0C E6 24 80 FB 60 20 50    ON INC.x ..$..` P
1080: 1E 24 E1 40 1A EB 04 F4   04 24 20 FB 78 08 12 15    .$.@.... .$ .x...
1090: 1A DB F9 78 08 E4 36 F7   08 09 E6 34 00 F7 22 77    ...x..6. ...4.."w
10A0: 00 09 77 00 22 75 0D 00   E6 64 2B 60 05 B6 2D 03    ..w."u.. .d+`..-.
10B0: 15 0D 08 C0 00 78 08 12   15 5D D0 00 75 0C 00 75    .....x.. .]..u..u
10C0: 22 00 C2 D5 7B 09 E6 24   D0 50 13 E6 24 C6 40 0E    "...{..$ .P..$.@.
10D0: BB 00 04 05 22 80 04 12   11 5A 1B 08 80 E8 B6 2E    ...."... .Z......
10E0: 19 08 E6 24 D0 50 13 E6   24 C6 40 0E BB 00 02 80    ...$.P.. $.@.....
10F0: 06 12 11 5A 1B 15 22 08   80 E8 20 D5 01 22 B6 45    ...Z..". .. ..".E
1100: 0B 08 79 14 12 0F 54 E7   25 22 F5 22 C0 00 75 0C    ..y...T. %"."..u.
1110: 9F 12 13 68 75 13 00 75   12 84 78 11 76 50 7B 03    ...hu..u ..x.vP{.
1120: 18 76 00 DB FB E5 22 20   E7 07 12 13 07 15 22 80    .v...."  ......".
1130: F4 E5 22 30 E7 07 12 12   F4 05 22 80 F4 78 08 E6    .."0.... .."..x..
1140: 24 40 F6 7A 03 08 E6 34   00 F6 DA F9 E6 30 E7 07    $@.z...4 .....0..
1150: 78 08 12 15 1A 05 0C D0   00 22 C0 00 78 08 12 15    x....... ."..x...
1160: 10 78 08 79 0E 12 15 54   78 08 12 15 10 78 08 12    .x.y...T x....x..
1170: 15 10 12 14 E8 D0 00 E6   54 0F 60 02 D2 D5 79 08    ........ T.`...y.
```

```
1180: 27 F7 7A 03 09 E7 34 00   F7 DA F9 22 78 0C E6 24   '.z...4. ..."x..$
1190: 80 FB 60 1A 50 18 24 E1   40 14 EB 04 F4 04 24 20   ..`.P.$. @.....$
11A0: FB 78 08 12 15 1A DB F9   78 08 E4 36 F7 22 77 00   .x...... x..6."w.
11B0: 22 E5 0D 60 03 76 2D 08   E5 0C 70 04 76 30 08 22   "..`.v-. ..p.v0."
11C0: C0 00 75 22 00 75 13 00   75 12 84 78 0E 12 15 5D   ..u"..u.. u..x...]
11D0: 75 11 50 E5 0C 24 7B 50   07 12 12 F4 05 22 80 F3   u.P..${P ....."..
11E0: E5 0C 24 7F 40 07 12 13   07 15 22 80 F3 E5 0C B4   ..$.@... .."....
11F0: 84 0B E5 0B 24 B0 50 05   12 12 F4 05 22 E5 0C B4   ....$.P. ....."...
1200: 84 07 78 08 12 15 10 80   0F E5 0C 24 7D 40 09 78   ..x..... ...$}@.x
1210: 08 12 15 1A 05 0C 80 F1   78 08 7A 03 E6 24 86 F6   ........ x.z..$..
1220: 08 E6 34 00 F6 DA F9 24   60 50 0B 76 10 7A 03 18   ..4....$ `P.v.z..
1230: 76 00 DA FB 05 22 79 18   7B 06 E5 0B C4 54 0F 24   v...."y. {....T.$
1240: 30 F7 C0 01 E5 0B 54 0F   F5 0B 78 08 12 15 10 78   0.....T. ..x....x
1250: 08 79 0E 12 15 54 78 08   12 15 10 78 08 12 15 10   .y...Tx. ...x....
1260: 12 14 E8 E5 0B C4 54 0F   24 30 D0 01 09 F7 DB D2   ......T. $0......
1270: D0 00 7A 06 7B 07 E7 64   30 70 04 19 1B DA F7 79   ..z.(..d 0p.....y
1280: 18 E5 22 20 E7 06 24 F9   40 40 80 08 EB 24 F8 C3   .." ..$. @@...$..
1290: 95 22 50 36 E5 22 30 E7   0C 76 2E 08 F4 60 06 FA   ."P6."0. .v...`..
12A0: 76 30 08 DA FB E7 F6 08   09 1B EB 60 0F E5 22 70   v0...... ...`.."p
12B0: 03 76 2E 08 E7 F6 08 09   15 22 DB F1 E5 22 60 09   .v...... ."..."`.
12C0: 20 E7 06 FA 76 30 08 DA   FB 22 79 18 E7 F6 08 09   ...v0.. ."y.....
12D0: EB 54 FE 60 03 76 2E 08   1B EB 60 06 E7 F6 08 09   .T.`.v.. ..`.....
12E0: DB FA 76 45 08 76 2B E5   22 30 E7 05 76 2D 08 F4   ..vE.v+. "0..v-..
12F0: 04 02 0F A5 E5 13 62 0D   C3 E5 0C 95 12 24 80 F5   ......b. .....$..
1300: 0C 12 14 43 02 13 68 E5   13 62 0D E5 0C 25 12 24   ...C..h. .b...%.$
1310: 7F F5 0C 12 14 6C 02 13   68 C3 E5 12 95 0C 40 0D   .....l.. h.....@.
1320: 78 08 79 0E 7A 06 E6 C7   F6 08 09 DA F9 C3 E5 0C   x.y.z... ........
1330: 95 12 FB 24 E2 50 01 22   78 0E 12 15 31 EB 60 07   ...$.P." x...1.`.
1340: 78 0E 12 15 28 DB F9 12   14 E8 E5 0D 65 13 60 0D   x...(... ....e.`.
1350: E5 0B 30 E7 08 78 08 12   15 06 85 13 0D 02 13 68   ..0..x.. .......h
1360: E5 13 F4 F5 13 02 13 19   78 07 7C 08 79 0C 80 06   ........ x.|.y...
1370: 78 0D 7C 0E 79 12 7B 04   E4 08 46 DB FC 70 04 F7   x.|.y.{. ..F..p..
1380: 09 F7 22 E8 FB E6 30 E7   06 EC F8 12 15 1A 07 EB   .."...0. ........
1390: F8 E6 20 E6 ED EC F8 12   15 10 17 80 F2 79 08 C3   ........ .....y..
13A0: 80 03 79 0E D3 7A 06 E4   93 F7 A3 09 DA F9 40 03   ..y..z.. ......@.
13B0: 02 13 68 02 13 70 CB B9   14 97 7F 00 02 D4 D4 6A   ..h..p.. .......j
13C0: 7F 00 33 F3 04 B5 7F 00   00 00 00 02 87 00 00 00   ..3..... ........
13D0: 00 01 87 00 00 00 00 3F   87 00 F5 28 5C 0F 7F 00   .......? ...(\...
13E0: 00 00 00 02 87 00 00 00   00 01 87 00 00 00 00 3F   ........ ...........?
13F0: 87 00 F5 28 5C 0F 7F 00   00 00 20 1C 8B 00 00 00   ...(\... ........
1400: 00 01 87 00 75 0D 00 78   08 80 05 75 13 00 78 0E   ....u..x ...u..x.
1410: 12 15 5D 76 8F 18 18 53   A8 FA E7 F6 08 09 E7 43   ..]v...S .......C
1420: A8 05 F6 B8 0B 03 02 13   68 02 13 70 7A 06 E6 F7   ........ h..pz...
1430: 08 09 DA FA 22 7A 06 E4   F6 08 DA FC 22 E6 F7 09   ...."z.. ...."...
1440: 77 00 22 78 14 12 15 5D   12 14 F7 7B 20 78 14 12   w."x...] ...( x..
1450: 15 10 78 08 12 15 10 50   05 12 14 E8 80 05 12 14   ..x....P ........
1460: F7 05 14 DB E8 78 14 79   08 02 15 54 78 08 79 14   .....x.y ...Tx.y.
1470: 12 15 54 78 08 12 15 5D   7B 1F 78 08 12 15 1A 78   ..Tx...] (.x....x
1480: 14 12 15 1A 50 03 12 14   E8 DB EF 22 12 15 3A 78   ....P... ..."..:x
1490: 08 79 14 12 15 54 78 08   12 15 5D 7B 20 78 08 12   .y...Tx. ..]{ x..
14A0: 15 10 78 14 12 15 10 50   03 12 14 E8 DB EF 78 08   ..x....P ......x.
14B0: 02 15 31 12 15 3A 7B 00   E5 11 20 E7 08 78 0E 12   ..1..:{. .....x..
14C0: 15 10 0B 80 F3 0B 78 14   12 15 5D 78 14 12 15 10   ......x. ..]x....
14D0: 12 14 F7 50 05 12 14 E8   80 02 05 14 78 0E 12 15   ...P.... ....x...
14E0: 1A DB E8 78 14 02 15 31   78 08 79 0E 7A 04 C3 E6   ...x...1 x.y.z...
14F0: 37 F6 08 09 DA F9 22 78   08 79 0E 7A 04 C3 E6 97   7....."x .y.z....
1500: F6 08 09 DA F9 22 7A 04   C3 E4 96 F6 08 DA FA 22   ....."z. ........"
1510: 7A 04 C3 E6 33 F6 08 DA   FA 22 E8 24 03 F8 C3 7A   z...3... .".$...z
1520: 04 E6 13 F6 18 DA FA 22   E8 24 03 F8 E6 33 02 15   ......." .$...3..
1530: 1F E5 0D B5 13 01 22 02   15 06 78 0B 79 0D 12 15   ......". ...x.y...
1540: 45 78 11 79 13 E6 C8 24   FD C8 77 00 20 E7 01 22   Ex.y...$ ..w..."
1550: 17 02 15 06 7A 04 E6 F7   08 09 DA FA 22 7A 04 E4   ....z... ....."z..
1560: F6 08 DA FC 22 78 08 80   10 78 08 80 06 78 0E 80   ...."x.. .x...x..x..
1570: 08 78 0E F6 08 7A 03 80   0A 7A 02 E7 F6 08 09 DA   .x...z.. .z......
1580: FA 7A 02 CA 60 0D CA 79   FF 20 E7 02 79 00 E9 F6   .z..`..y . ..y...
1590: 08 DA FB 22                                         ..."
```

We claim:

1. A system for calculating the angular displacement of two objects with respect to a reference position for controlling the field of view of a camera comprising: a base unit and a movable remote unit, said base unit having a first transmitter means for transmitting a first transmitted signal, said first transmitter means including signal positioning means for varying the angular displacement of the position of said first transmitted signal with respect to a reference angle as established by said signal positioning means, said signal positioning means including position detecting means for providing a position output signal representative of said position of said first transmitted signal, said remote unit including first receiver means responsive to said first transmitted signal and providing a receiver output signal in response to having received said first transmitted signal, said first receiver means providing a first output signal in response to said receiver output signal, said remote unit further including second transmitter means for transmitting a second transmitted signal, said second transmitter means responsive to said first output signal for providing in said second transmitted signal an information signal indicative of said receiver output signal having been received, said base unit further including second receiver means responsive to said second transmitted signal for providing a second output signal indicative of said first output signal, said base unit further including control circuit means responsive to said position output signal and said second output signal for determining the angular displacement of the position of said first transmitted signal and for determining the angular displacement between said reference angle and said first receiver means and providing an error output signal indicative of said angular displacement, and means for controlling the field of view of a camera in response to said error output signal.

2. The system as defined in claim 1 wherein said signal positioning means varies the angular displacement of said position of said first transmitted signal by varying the angular displacement of the position of a predetermined level of the signal strength of said first transmitted signal with respect to said reference angle.

3. The system as defined in claim 2 wherein said position output signal provided by said position detecting means is representative of the angular displacement of said predetermined level of signal strength.

4. The system as defined in claim 3 wherein said first receiver means is responsive to the strength of said first transmitted signal and provides said receiver output signal in response to the strength of said first transmitted signal, said first receiver means including signal strength detection circuit means for determining the relative strength of said receiver output signal and providing said first output signal when said receiver output signal is at a predetermined level as established by said signal strength detection circuit means, said second transmitter means providing said information signal indicative of the strength of said receiver output signal being at said predetermined level, said control circuit means determining said position of said predetermined level of signal strength and receiving said information signal at a time when said first receiver means receives said predetermined level of signal strength of said first transmitted signal for determining location of said second transmitter means.

5. The system as defined in claim 2 wherein said signal positioning means includes a movable lens positioned between said first transmitter means and said receiver, said first transmitter, means transmitting said first transmitted signal through said lens, said signal positioning means including mechanical means for repetitive movement of said movable lens with respect to said first transmitter means for varying the angle at which the signal strength of said first transmitted signal is at said predetermined level in response to movement of said lens.

6. The system as defined in claim 5 wherein said first transmitter means includes an infrared signal source.

7. The system as defined in claim 6 wherein said position detecting means is responsive to the movement of said lens for providing said position output signal indicative of the position of said lens with respect to said reference angle.

8. The system as defined in claim 7 wherein said second transmitted signal is a radio frequency signal.

9. The system as defined in claim 1 wherein said first transmitter means includes a source of electromagnetic energy.

10. The system as defined in claim 1 wherein said second transmitted signal is a radio frequency signal.

11. The system as defined in claim 2 wherein said predetermined level of the signal strength of said first transmitted signal is the maximum level.

12. The system as defined in claim 1 wherein said signal positioning means varies the angular displacement of said predetermined level of the signal strength in a substantially horizontal plane.

13. The system as defined in claim 1 wherein said signal positioning means varies the angular displacement of said predetermined level of the signal strength in a substantially vertical plane.

14. The system as defined in claim 1 wherein said control circuit means includes means for comparing one said error output signal indicative of one said angular displacement with a successive said error output signal indicative of a successive said angular displacement for determining the directional movement of said remote unit with respect to said base unit.

15. The system as defined in claim 14 wherein said control circuit means includes means for determining the real time of successive said angular displacements of said remote unit for determining the rate of directional movement of said remote unit with respect to said base unit.

16. The system as defined in claim 1 wherein said base unit includes movable means responsive to said error output signal for moving said base unit in response to said error output signal.

17. The system as defined in claim 14 wherein said base unit includes movable means responsive to each said error output signal for moving said base unit as determined by said error output signal.

18. The system as defined in claim 17 wherein said base unit includes command circuit means for selectively providing a plurality of command signals to said control circuit means for selectively altering said error output signal provided from said control circuit means to said movable means for selectively controlling the movement of said base unit in response to said error signals.

19. The system as defined in claim 18 further comprising means responsive to a first said command signal when selected for enabling said control circuit means to provide said error output signal to said movable means.

20. The system as defined in claim 18 further comprising means responsive to a first said command signal when selected for preventing said control circuit means from providing said error output signal to said movable means.

21. The system as defined in claim 18 further comprising means responsive to a first said command signal when selected for altering said error output signal by an angular deviation from said angular displacement determined by said error output signal, defining an offset angle.

22. The system as defined in claim 7 wherein said first return signal is a radio frequency signal.

23. The system as defined in claim 1 wherein said signal transmitter means includes a source of electromagnetic energy.

24. A system for calculating the angular displacement of one object with respect to another for controlling the field of view of a camera comprising a base station in a known position with respect to one object and a movable remote unit in a known position with respect to another object, said base station including a first transmitter assembly having first transmitter means for transmitting a first scanning signal and including signal positioning means for scanning an area in a plane with said first scanning signal and having position indicating means for providing a first output signal indicative of the position of said first scanning signal, said remote unit having a receiver circuit means for detecting the passage of said scanning signal across said remote unit and providing a signal detected output signal when said first scanning signal is received, first remote transmitter means responsive to said signal detected output signal for transmitting a first return signal which includes information indicating that said first scanning signal was received, said base station further including circuit means responsive to said first output signal and said first return signal for determining the relative position of said remote unit with respect to said base station by determining the position of said first scanning signal when said receiver circuit means receives said first scanning signal across said remote unit and providing a control output signal indicative of the angular displacement of said remote unit with respect to said base station, and means for controlling the field of view of a camera in response to said control output signal.

25. The system as defined in claim 24 wherein said signal positioning means includes a movable lens positioned between said first transmitter means and said receiver circuit means, said first transmitter means transmitting said first scanning signal through said lens, said signal positioning means including mechanical means for repetitive movement of said lens with respect to said first transmitter means for repetitively varying the angle of said first scanning signal in response to movement of said lens for repetitively scanning an area with said scanning signal.

26. The system as defined in claim 24 wherein said signal positioning means includes a movable lens, said first transmitter means positioned to transmit said first scanning signal through said lens, said signal positioning means further including mechanical means for repetitive movement of said
  lens with respect to said first transmitter means for varying the angle at which the signal strength of said first scanning signal is at a maximum value in response to movement of said lens during successive time intervals for scanning an area with said scanning signal during respective said successive time intervals.

27. The system as defined in claim 26 wherein said circuit means includes means for determining the direction said remote unit is moving with respect to said base station by successively determining the position of said scanning signal at the time said receiver circuit means receives said scanning signal across said remote unit during a series of said time intervals and for providing a second control output signal indicative of said direction of movement.

28. The system as defined in claim 27 wherein said base station includes movable means responsive to said first and second control output signals for moving said base station in response to said control output signals.

29. The system as defined in claim 26 wherein said circuit means includes means for determining the direction and speed of movement of said remote unit with respect to said base station by successively determining the position of said first scanning signal at the time said receiver circuit means receives said scanning signal across said remote unit during a series of said time intervals, means including second means for determining the real time of successive determinations of position of said remote unit for determining the rate of directional movement of said remote unit with respect to said base station and providing a second control output signal indicative of said rate and direction of movement.

30. The system as defined in claim 29 wherein said base station includes movable means responsive to said first and second control output signals for moving said base station in response to said control output signals.

31. The system as defined in claim 30 wherein said circuit means includes command signal circuit means for selectively enabling and disabling said first and second control output signals for selectively controlling the response of said movable means to said control output signals.

32. Apparatus for determining the location of a first object with reference to a second object comprising a base unit in a known position with respect to the second object and a remote unit in a known position with respect to said first object and both said remote unit and said first object being movable in at least two dimensions, said apparatus including a pair of systems for determining the angular displacement of a said remote unit with respect to said base unit, said pair of systems including a first said system for determining the angular displacement of a said remote unit with respect to said base unit in the horizontal plane and a second said system for determining the angular displacement of a said remote unit with respect to said base unit in the vertical plane, each said system including a signal transmitter means for transmitting a scanning signal, said signal transmitter means including signal positioning means for varying the displacement of the position of said scanning signal in a plane during a time interval with respect to a reference angle as established by said signal positioning means, said signal transmitter means further including position indicating means for providing a first output signal indicative of the position of said scanning signal continuously during said time interval, signal receiver means for receiving said scanning signal across said receiver means and providing a signal detected output signal in response to the receiving of said scanning signal by said receiver means, return signal transmission means responsive to said signal detected output signal for transmitting a first return signal which includes a first information signal indicating that said scanning signal was received by said receiver means, return signal receiver means responsive to said first return signal and providing a second output signal indicative of said scanning signal being received by said signal receiver means, control circuit means responsive to said first and second output signals for determining the relative position of said signal receiver means with respect to said reference angle by determining the position of said scanning signal at the time said signal receiver means receives said scanning signal during said time interval and providing a first error control signal indicative of the angular displacement of said signal receiver means with respect to said reference angle in respective said plane.

33. The apparatus as defined in claim 32 wherein said signal receiver means includes a single signal receiver circuit means common to both said systems.

34. The apparatus as defined in claim 32 wherein said signal receiver means includes a signal receiver circuit means for each said system.

35. The apparatus as defined in claim 32 wherein said base unit includes said signal transmitter means, said return receiver means and said control circuit means for each said system,
said remote unit includes said signal receiver means and said return signal transmission means for each said system.

36. The apparatus as defined in claim 35 wherein each said signal positioning means includes a movable lens, said respective signal transmitter means positioned to transmit said scanning signal through said lens, said signal positioning means further including mechanical means for repetitive movement of said lens with respect to said transmitter means for varying the angle of said scanning signal in response to movement of said lens during successive time intervals for scanning an area in a plane with said scanning signal during respective said time intervals.

37. The apparatus as defined in claim 36 wherein said control circuit means includes computational circuit means for determining the directional movement of a said remote unit in a said plane wit respect to said base unit by successive comparison of a said first error control signal indicative of the angular displacement in said plane of said remote unit during one respective said time interval with another said first error control signal during another said time interval and providing a second error control signal indicative of said directional movement.

38. The apparatus as defined in claim 37 wherein said computational circuit means includes clock means for determining the real time of successive comparisons for computing the rate of said directional movement of said remote unit, said control circuit means providing a third error control signal indicative of said rate of directional movement.

39. The apparatus as defined in claim 37 wherein said computational circuit means includes circuit means for distance determination of a said remote unit from said base unit, said circuit means having data indicative of the distance between respective said signal transmitter means in said systems and being responsive to error control signals from said first and second systems and providing a third error control signal indicative of said distance determination.

40. The apparatus as defined in claim 37 wherein said base unit includes movable means responsive to said first and second error control signals from each said system for moving said base unit in response to said error control signals.

41. The apparatus as defined in claim 38 wherein said base unit includes movable means, said movable means being responsive to said third error control signals from each said system for moving said base unit in response to said rate of directional movement.

42. The apparatus as defined in claim 37 wherein the second object includes a camera having a visual lens, said base unit further including movable means responsive to said first and second error control signals from each said system for moving said camera in response to respective said error control signals.

43. The apparatus as defined in claim 37 wherein the second object includes a camera having a visual lens, said base unit further including movable means responsive to said first, second and third error control signals from each said system for moving said camera in response to respective said error control signals.

44. The apparatus as defined in claim 39 wherein the second includes a camera having an adjustable zoom lens and zoom control means for selectively adjusting said lens, said base unit further including movable means responsive to said first, second and third error control signals from each said system for moving said camera in response to respective said error control signals and for supplying a zoom control signal to said zoom control means for selective adjustment of said lens in response to said distance determination.

45. The apparatus as defined in claim 32 further comprising signal transmitter control circuit means for providing alternating transmitter control signals to each respective said signal transmitter means for causing one said respective signal transmitter means transmit said scanning signal from one respective said system before the transmission of said scanning signal from the other said system and continue said transmissions in an alternating manner.

46. The system as defined in claim 40, wherein said base unit includes command circuit means for selectively providing a plurality of command signals to said control circuit means for selectively controlling said error output signal provided from said control circuit means to sad movable means for selectively controlling the movement of said base unit in response to said error signals.

47. The system as defined in claim 46 wherein a first said command signal when selected will allow said control circuit means to provide said error output signals to said movable means.

48. The system as defined in claim 46 wherein a first said command signal when selected will prevent said control circuit means from providing said error output signals to said movable means.

49. The system as defined in claim 46 wherein a first said command signal when selected will alter said first error output signal by an angular deviation from said angular displacement determined by said error output signal, defining an offset angle.

50. The system as defined in claim 32 wherein said first output signal provided by respective said position detecting means is representative of the angular displacement of respective said signal.

51. The system as defined in claim 50 wherein said signal receiver means is responsive to the strength of said scanning signal and provides said signal detected output signal in response to the strength of said scanning signal, said signal receiver means including signal strength detection circuit means for determining the relative strength of said signal detected output signal and providing said signal detected output signal when said signal detected output signal is at a predetermined level as established by said signal strength detection circuit means, said second transmitter means providing said first information signal indicative of the strength of said signal detected output signal being at said predetermined level, said control circuit means determining said position of said scanning signal and receiving said information signal at a time when said signal receiver means receives said predetermined level of signal strength of said scanning signal for determining location of said return signal transmission means.

52. The system as defined in claim 51 wherein said signal transmitter means in each said system includes an infrared signal source.

53. The system as defined in claim 36 wherein said position detecting means is responsive to the movement of said lens for providing said first output signal indicative of the position of said lens with respect to said reference angle.

54. The system as defined in claim 32 wherein said first return signal is a radio frequency signal.

55. In the system as defined in claim 51 wherein said predetermined level of the signal strength of said first transmitted signal is the maximum level.

56. In the system as defined in claim 50 wherein one said signal positioning means varies the angular displacement of said signal in a substantially horizontal plane.

57. In the system as defined in claim 50 wherein one said signal positioning means varies the angular displacement of said signal in a substantially vertical plane.

58. A method of tracking a movable object with a camera mounted on a movable means for moving the camera by determining the location of the object with respect to a reference position comprising the steps of:
A. scanning an area containing the object with a first and second transmitted signal from a respective first and second electromagnetic energy source by varying the position of the signal through the area in substantially the horizontal plane with the first signal and in substantially the vertical plane with the second signal;
B. receiving at the object the transmitted signals;
C. providing a first and second signal indicative of the time at which the first and second transmitted signals were received at the object;
D. computing the angular displacement of the object with respect to the reference position in the horizontal and vertical planes by repetitively comparing the result of step C;
E. computing the direction of movement of the object in the horizontal and vertical planes by successively comparing the calculated angular displacements of the object in each plane; and
F. moving the camera in accordance with the results obtained in step E.

59. The method of claim 58 wherein step D includes the steps of:
G. providing a first output signal indicative of the angular displacement of the object from the reference position in the horizontal plane to the movable means;
H. providing a second output signal indicative of the angular displacement of the object from the reference position in the vertical plane to the movable means; and
I. moving the camera by the movable means in response to the output signals to alter the angular displacement of the object from the reference position in either one or both of the horizontal and vertical planes.

60. The method of claim 58 wherein step E includes the steps of:
G. determining the real time between successive displacement calculations in both planes; and
H. computing the rate of movement of the object in both planes in real time by calculating the rate of change of the displacement of the object during successive time intervals.

61. The method of 58 further including the steps of:
G. providing a first output signal indicative of each of the calculated angular displacements; and
H. providing a second output signal indicative of the direction of movement of the object in each plane with respect to the reference angle.

62. The method of claim 61 wherein step H includes the step of:
I. providing output signals indicative of the rate of movement of the object in each plane with respect to the reference angle.

63. The method of claim 59 further including the step of:
G. selectively modifying the output signals by an amount equal to a desired offset angle to provide for tracking of a point that is displaced angularly by the selected offset angle from the object.

64. A method of positioning a camera that is movable by a command-driven controller having memory to track a position that is offset from a movable object comprising the steps of:
A. placing the object in a reference position in the field of view of the camera;
B. providing a command to the controller indicating that the object is in the reference position in accordance with step A;
C. repositioning the object to another desired position angularly offset from the reference position;
D. providing a second command to the controller indicating that the object is positioned in the other desired position in accordance with step C; and
E. providing a third command to the controller to operate the controller for maintaining the camera pointed at the object angularly offset by the angular displacement between the reference position and the other desired position regardless of the position of the object.

65. The method of claim 64 wherein step A includes the step of positioning the object in the center of the field of view.

66. A system for determining the actual angular location of an object relative to a reference position for controlling the field of view of a camera including first transmitter means disposed at said reference position for generating an electromagnetic energy signal elongated in a predetermined direction, scanning means for moving said signal in a direction substantially perpendicular to said predetermined direction, first means in a known relationship with respect to said object responsive to irradiation with respect to said object responsive to irradiation by said signal and generating an output signal indicative of an alignment of said first signal relative to said object, means responsive to said output signal for determining the location of said signal to establish the actual angular location of the object, and means to control the field of view of a camera in response to the established actual angular location of the object.

67. Apparatus for determining the location of a first object with reference to a second object comprising a base unit in a known position with respect to the second object and ar emote unit in a known position with resect to said first object and both said remote unit and said first object being movable in at least two dimensions, said apparatus including a pair of systems for determining the angular displacement of a said remote unit with respect to said base unit, said pair of systems including a first said system for determining the angular displacement of a said remote unit with respect to said base unit in the horizontal plane and a second said system for determining the angular displacement of a said remote unit with respect to said base unit in the vertical plane, each said system including a signal transmitter means for transmitting a scanning signal, said signal transmitter means including signal positioning means for varying the displacement of the position of said scanning signal in a plane with respect to a reference angle as established by said signal positioning means, said signal transmitter means further including position indicating means for providing a first output signal indicative of the position of said scanning signal, signal receiver means for detecting the passage of said scanning signal across said receiver means and providing a signal detected output signal in response to the detection of said scanning signal by said receiver means, return signal transmission means responsive to said signal detected output signal for transmitting a first return signal which includes a first information signal indicating that said scanning signal was detected by said receiver means, return signal receiver means responsive to said first return signal and providing a second output signal indicative of said scanning signal being detected by said signal receiver means, control circuit means responsive to said first and second output signals for determining the relative position of said signal receiver means with respect to said reference angle by determining the position of said scanning signal at the time said signal receiver means detects said scanning signal and providing a fist error control signal indicative of the angular displacement of said signal receiver means with respect to said reference angle in respective said plane.

68. A method of calculating the angular displacement of one object in two planes with respect to a reference angle comprising the steps of:

A. scanning an area in two planes containing the object with a transmitted signal from a location from an electromagnetic energy source by varying the position of the signal through the area;

B. detecting at the object the transmitted signal received at the object;

C. generating a signal from the object indicative of an alignment of the transmitted signal relative to the object and transmitting the signal; and D. receiving the transmitted signal from step C and computing the angular displacement of the object in two planes with respect to the reference angle.

69. A method of tracking a movable object with a camera mounted on a movable means for moving the camera by determining the location of the object with respect to a reference position comprising the steps of:

A. scanning an area containing the object with a first transmitted signal from a first electromagnetic energy source by varying the position of the signal through the area in a first plane with the first signal;

B. detecting at the object the first transmitted signal which is received a the object;

C. providing a first signal indicative of the time at which the first transmitted signal was received at the object;

D. computing the angular displacement of the object with respect to the reference position in the plane by comparing the results of step C;

E. computing the direction of movement of the object in the plane by successively comparing the calculated angular displacements of the object; and F. moving the camera in accordance with the results obtained in step E.

70. The method of claim 69 further including the steps of:

G. scanning the area with a second transmitted signal from a second electromagnetic energy source by varying the position of the signal through the area in another plane;

H. detecting at the object the second transmitted signal which is received at the object;

I. providing a second signal indicative of the time at which the second transmitted signal was received at the object;

J. computing the angular displacement of the object with respect to the reference angle in the second plane by comparing the results obtained in step I; and K. repeating steps E and F for the direction of movement and moving the camera in the second plane.

* * * * *